US012728760B2

(12) United States Patent
Kinugawa et al.

(10) Patent No.: US 12,728,760 B2
(45) Date of Patent: Sep. 8, 2026

(54) MONITORING SYSTEM OF ENERGY STORAGE IN WORKING MACHINE

(71) Applicant: Kubota Corporation, Osaka (JP)

(72) Inventors: Ryosuke Kinugawa, Sakai (JP); Ryo Ikeda, Sakai (JP); Keisuke Miura, Sakai (JP); Kenji Ishihara, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/983,486

(22) Filed: Dec. 17, 2024

(65) Prior Publication Data

US 2025/0115156 A1 Apr. 10, 2025

Related U.S. Application Data

(63) Continuation of application No. PCT/JP2023/021273, filed on Jun. 7, 2023.

(30) Foreign Application Priority Data

Jun. 30, 2022 (JP) ................................ 2022-105612

(51) Int. Cl.
*B60L 58/10* (2019.01)
*A01B 76/00* (2006.01)
(Continued)

(52) U.S. Cl.
CPC .............. *B60L 58/10* (2019.02); *A01B 76/00* (2013.01); *B60L 15/00* (2013.01); *B60L 50/64* (2019.02);
(Continued)

(58) Field of Classification Search
CPC .......... B60L 58/10; B60L 15/00; B60L 50/64; B60L 53/80; B60L 2200/40; B60L 53/68;
(Continued)

(56) References Cited

U.S. PATENT DOCUMENTS 10,356,591 B1 7/2019 Tengwall et al.
11,954,947 B2 * 4/2024 Kaechi .................. B60K 35/29
(Continued)

FOREIGN PATENT DOCUMENTS

JP 2006155198 A 6/2006
JP 2008042985 A 2/2008
(Continued)

OTHER PUBLICATIONS

International Search Report in PCT/JP2023/021273, mailed Aug. 22, 2023, 5 pages.
(Continued)

*Primary Examiner* — Brodie J Follman
(74) *Attorney, Agent, or Firm* — Keating & Bennett, LLP

(57) ABSTRACT

A monitoring system includes a battery to store an energy source to drive a working machine, and a monitoring computer including an area setter configured or programmed to set an area for the battery, and a first monitoring section configured or programmed to monitor the battery by providing a notification for the battery or a restriction for the battery in a case where the battery is not located in the set area. With this configuration, in a case where the battery is not located in the area determined for the battery, the notification or restriction is provided. Therefore, the battery can be easily monitored.

20 Claims, 24 Drawing Sheets

(51) Int. Cl.
*B60L 15/00* (2006.01)
*B60L 50/64* (2019.01)
*B60L 53/80* (2019.01)
*B60Q 9/00* (2006.01)

(52) U.S. Cl.
CPC ................ *B60L 53/80* (2019.02); *B60Q 9/00* (2013.01); *B60L 2200/40* (2013.01)

(58) Field of Classification Search
CPC .......... A01B 76/00; B60Q 9/00; B62D 49/00; G06Q 10/06; G06Q 50/02
See application file for complete search history.

(56) References Cited

U.S. PATENT DOCUMENTS

| | | | |
|---|---|---|---|
| 2019/0036178 | A1 | 1/2019 | Karner et al. |
| 2021/0199440 | A1 | 7/2021 | Kinugawa et al. |
| 2021/0296670 | A1 | 9/2021 | Mori et al. |

FOREIGN PATENT DOCUMENTS

| | | | |
|---|---|---|---|
| JP | 2020529663 | A | 10/2020 |
| JP | 2021106555 | A | 7/2021 |
| WO | 2016052703 | A1 | 4/2016 |
| WO | 2019023678 | A1 | 1/2019 |
| WO | 2020121496 | A1 | 6/2020 |

OTHER PUBLICATIONS

Official Communication issued in corresponding European Patent Application No. 23831011.4, mailed on June 5, 2026, 14 pages.

* cited by examiner

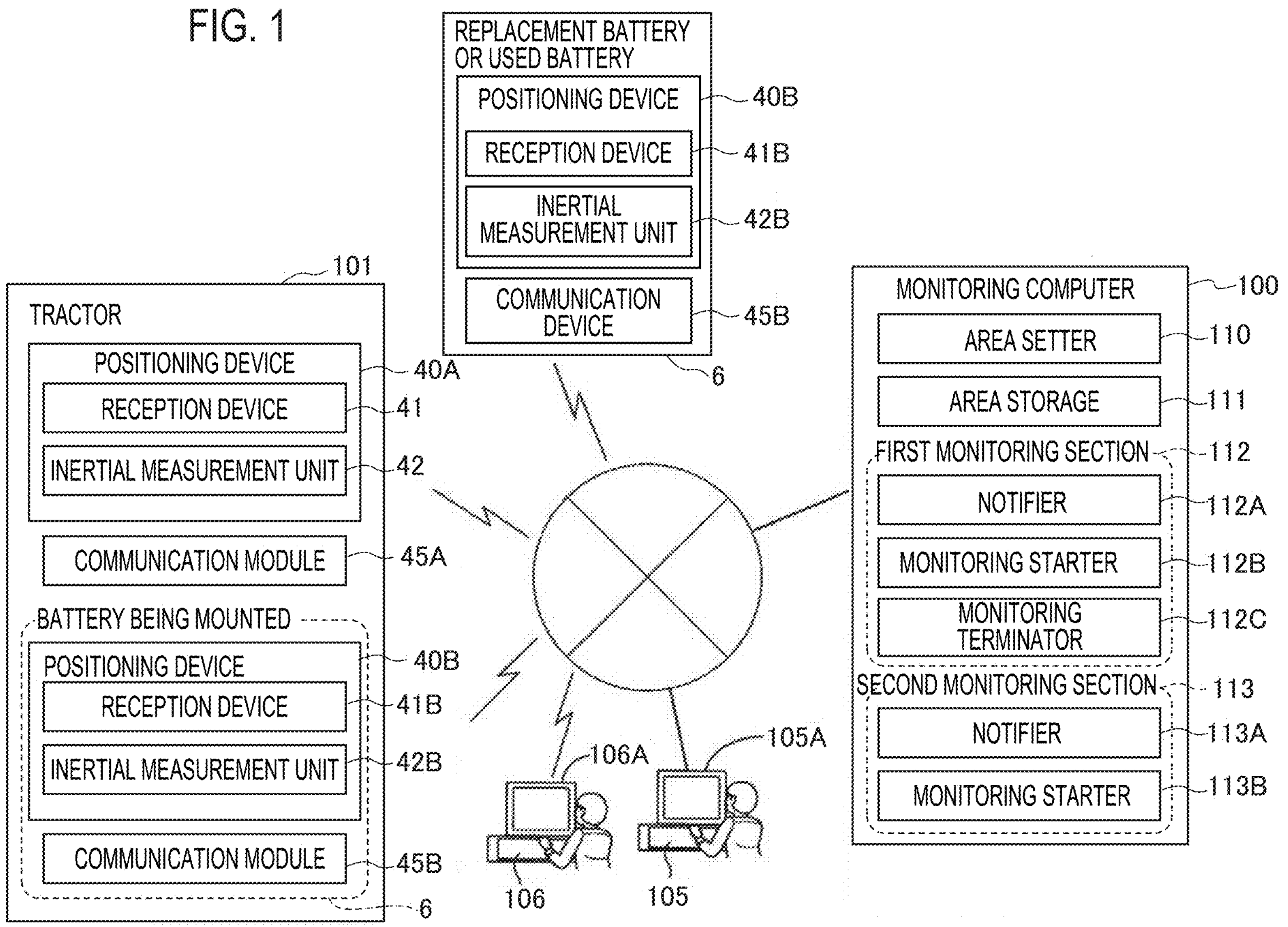
FIG. 1
REPLACEMENT BATTERY OR USED BATTERY
POSITIONING DEVICE
RECEPTION DEVICE
INERTIAL MEASUREMENT UNIT
COMMUNICATION DEVICE
40B
41B
42B
45B
6
TRACTOR
POSITIONING DEVICE
RECEPTION DEVICE
INERTIAL MEASUREMENT UNIT
COMMUNICATION MODULE
BATTERY BEING MOUNTED
POSITIONING DEVICE
RECEPTION DEVICE
INERTIAL MEASUREMENT UNIT
COMMUNICATION MODULE
101
40A
41
42
45A
40B
41B
42B
45B
6
106A
105A
106
105
MONITORING COMPUTER
AREA SETTER
AREA STORAGE
FIRST MONITORING SECTION
NOTIFIER
MONITORING STARTER
MONITORING TERMINATOR
SECOND MONITORING SECTION
NOTIFIER
MONITORING STARTER
100
110
111
112
112A
112B
112C
113
113A
113B CONTROLLER
COMMUNICATION MODULE
BATTERY
COMMUNICATION MODULE
4
5
5a
5b
5c
5d
5e
5f
6
7F
8
8a
8b
8c
8e
12
13
14
15
16
17
18
19
20F
20R
21F
21R
22
25
26
27
29
30
31
32
33
34
35
40A
40B
41
41B
42
42B
43a
43b
43c
43d
43e
43f
43g
43h
43i
43j
43k
45A
45B
60
N1

FIG. 6

| AREA INFORMATION | | |
|---|---|---|
| IDENTIFICATION INFORMATION | CENTER | DISTANCE |
| TRACTOR | 135.470,34.559 | 10km |
| BATTERY | 135.470,35.174 | 10km |

BATTERY MONITORING : 「ON」
BATTERY POSITION : 「INSIDE AREA → OUTSIDE AREA」
NOTIFICATION : 「NOTIFIED」

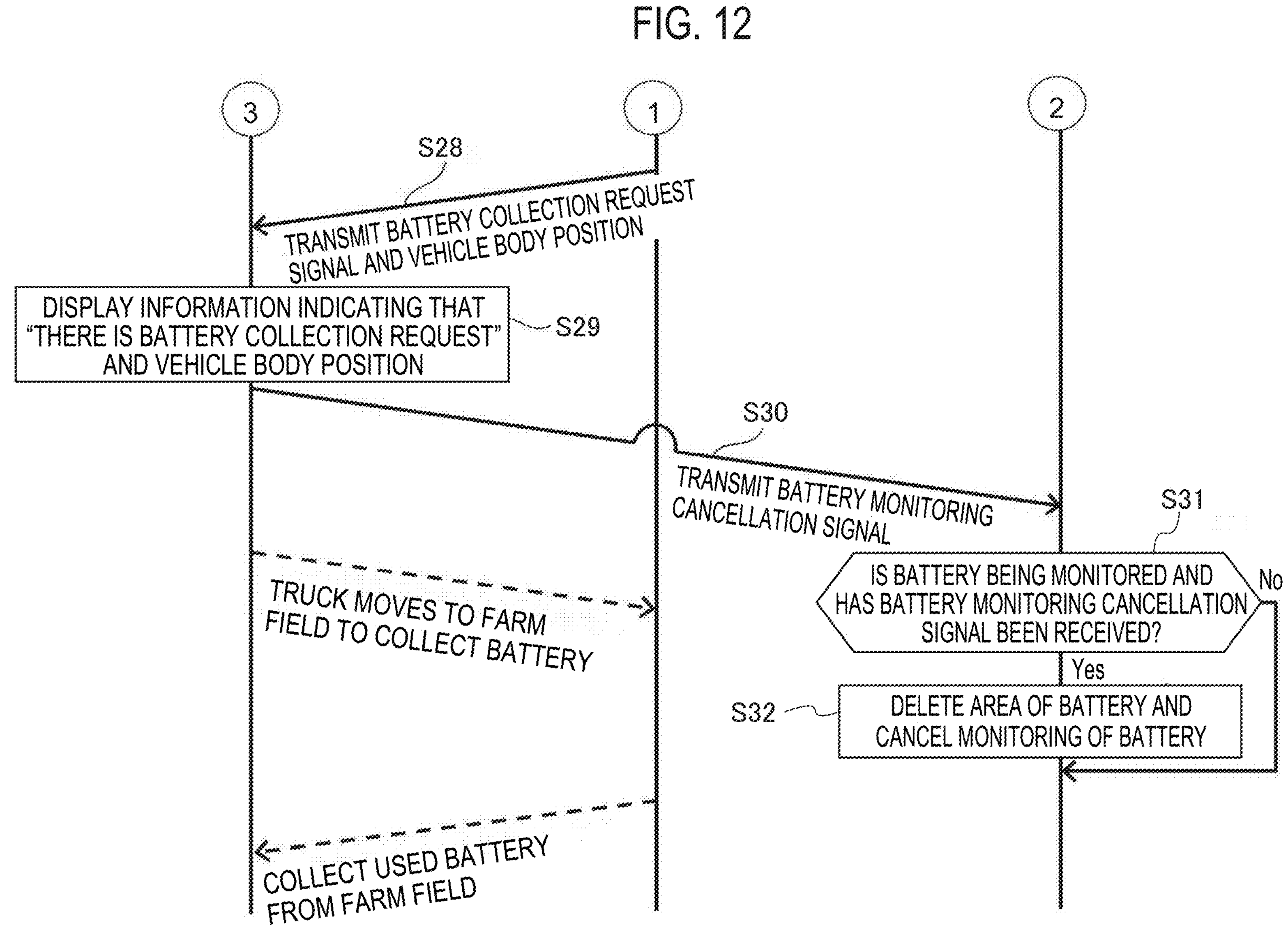
FIG. 12
3
1
2
S28
TRANSMIT BATTERY COLLECTION REQUEST SIGNAL AND VEHICLE BODY POSITION
DISPLAY INFORMATION INDICATING THAT "THERE IS BATTERY COLLECTION REQUEST" AND VEHICLE BODY POSITION
S29
S30
TRANSMIT BATTERY MONITORING CANCELLATION SIGNAL
S31
IS BATTERY BEING MONITORED AND HAS BATTERY MONITORING CANCELLATION SIGNAL BEEN RECEIVED?
No
Yes
S32
DELETE AREA OF BATTERY AND CANCEL MONITORING OF BATTERY
TRUCK MOVES TO FARM FIELD TO COLLECT BATTERY
COLLECT USED BATTERY FROM FARM FIELD

CONTROLLER
COMMUNICATION MODULE
BATTERY
COMMUNICATION MODULE

CONTROLLER
COMMUNICATION MODULE
BATTERY
COMMUNICATION MODULE
60
45A
45B
N1
40A
40B
41B
42B
19
19c
6
4
5
5a
5b
5c
5d
5e
5f
7F
8
8a
8b
8c
8e
12
13
14
15
16
17
18
20F
20R
21F
21R
22
25
26
27
29
30
31
32
33
34
35
41
42
43a
43b
43c
43d
43e
43f
43g
43h
43i
43j
43k

MONITORING SYSTEM OF ENERGY STORAGE IN WORKING MACHINE

CROSS-REFERENCE TO RELATED APPLICATIONS

The present application is a continuation of PCT Application No. PCT/JP2023/021273, filed on Jun. 7, 2023, which claims the benefit of Japanese patent application No. 2022-105612 filed on Jun. 30, 2022, the entire contents of each application being incorporated herein by reference in their entirety.

BACKGROUND OF THE INVENTION

1. Field of the Invention

The present invention relates to monitoring systems of energy storages that store energy to drive working machines including, for example, agricultural machines, construction machines, and the like.

2. Description of the Related Art

A monitoring system of JP-A 2021-106555 is known as a system to monitor a working machine such as an agricultural machine. The monitoring system of JP-A 2021-106555 includes a notifier that provides a notification for a working body based on whether or not the working body is located in an area determined for the working body. As a result, in a case where it is determined that the working body is located outside the area, the notification for the working body is provided, so that the working body can be easily monitored.

SUMMARY OF THE INVENTION

In recent years, a trend of electrification and emission control has accelerated for working machines. As a prime mover, for example, a motor or the like may be used. In this case, a battery or the like that supplies electric energy to the prime mover is often used.

Such a type of battery or the like may be replaceable. When replacing the battery or the like, for example, a case in which a new replacement battery or the like is left in a farm field or the like in advance or a used battery or the like is left in the farm field or the like for efficient work is assumed. That is, the battery or the like may be left at a position different from a position of the working machine performing work. In this case, there is a great demand to monitor the battery and the like. In addition, there is a great demand to monitor the battery or the like even in a state in which the battery or the like is mounted on the working machine. It is difficult for the technology described in JP-A 2021-106555 to meet the above demand.

Therefore, example embodiments of the present invention provide monitoring systems each capable of easily monitoring energy storages that store energy to drive working machines.

A monitoring system according to an example embodiment of the present invention includes a storage to store energy to drive a working machine, and a monitoring computer configured or programmed to include an area setter configured or programmed to set an area for the storage, and a first monitoring section configured or programmed to monitor the storage by providing a notification for the storage or a restriction for the storage in a case where the storage is not located in the set area.

The storage is attachable to and detachable from the working machine, and the first monitoring section is configured or programmed to provide the notification for the storage in a case where the storage that is not mounted on the working machine is not located in the set area.

The storage is attachable to and detachable from the working machine, and the first monitoring section is configured or programmed to restrict replenishment of the storage with the energy source in a case where the storage that is not mounted on the working machine is not located in the set area.

The storage is attachable to and detachable from the working machine, and the first monitoring section is configured or programmed to restrict supply of the energy source to the working machine in a case where the storage mounted on the working machine is not located in the set area.

The storage is attachable to and detachable from the working machine, and the first monitoring section is configured or programmed to restrict attachment and detachment of the storage to and from the working machine in a case where the storage mounted on the working machine is not located in the set area.

The storage is attachable to and detachable from the working machine and is conveyable in a state of not being mounted on the working machine, and the first monitoring section is configured or programmed to cancel the monitoring in a case where the storage to replace the storage mounted on the working machine is conveyed, and the first monitoring section is configured or programmed to start the monitoring in a case where the storage for the replacement is mounted on the working machine while the monitoring is cancelled.

The first monitoring section is configured or programmed to maintain the monitoring in a case where the monitoring is started, and the first monitoring section is configured or programmed to cancel the monitoring in a case where the storage that is not mounted on the working machine is conveyed while the monitoring is maintained.

The storage mounted on the working machine is replaced such that the energy source to maintain the monitoring remains.

The monitoring computer is configured or programmed to include a second monitoring section configured or programmed to monitor whether or not the working machine is located in the area, the area setter is configured or programmed to set the area for the storage based on a position of the working machine, and the first monitoring section is configured or programmed to perform the monitoring of the storage in a case where the second monitoring section performs the monitoring of the working machine.

According to example embodiments of the present invention, it is possible to easily monitor energy storages to store energy to drive working machines.

The above and other elements, features, steps, characteristics and advantages of the present invention will become more apparent from the following detailed description of the example embodiments with reference to the attached drawings.

BRIEF DESCRIPTION OF THE DRAWINGS

FIG. 1 is an overall diagram showing a monitoring system according to a first example embodiment of the present invention.

FIG. 6 is a diagram showing an example of area information set by an area setter of a monitoring computer.

FIG. 12 shows a portion of a flowchart following FIG. 11 showing a flow of the notification based on monitoring start, monitoring cancellation, and monitoring of the battery by the monitoring system.

DETAILED DESCRIPTION OF THE EXAMPLE EMBODIMENTS

Hereinafter, example embodiments of the present invention will be described with reference to the drawings.

First Example Embodiment

FIG. 1 shows a working machine and a monitoring system configured or programmed to monitor a battery of the working machine. The monitoring system includes a monitoring computer 100. The monitoring computer 100 monitors a working machine 101 and a battery 6. The working machine 101 includes an agricultural machine 101*a* such as a tractor, a combine harvester, or a rice transplanter, and an implement 101*b* couplable to the agricultural machine 101*a* (see FIG. 20). The monitoring computer 100 may be an installation type computer such as a server, a portable type computer such as a smartphone, a tablet, or a notebook computer, or the like. In the present example embodiment, the monitoring computer 100 will be described as a server. The working machine 101 may be a construction machine or the like instead of the agricultural machine 101*a*.

Figure 20:
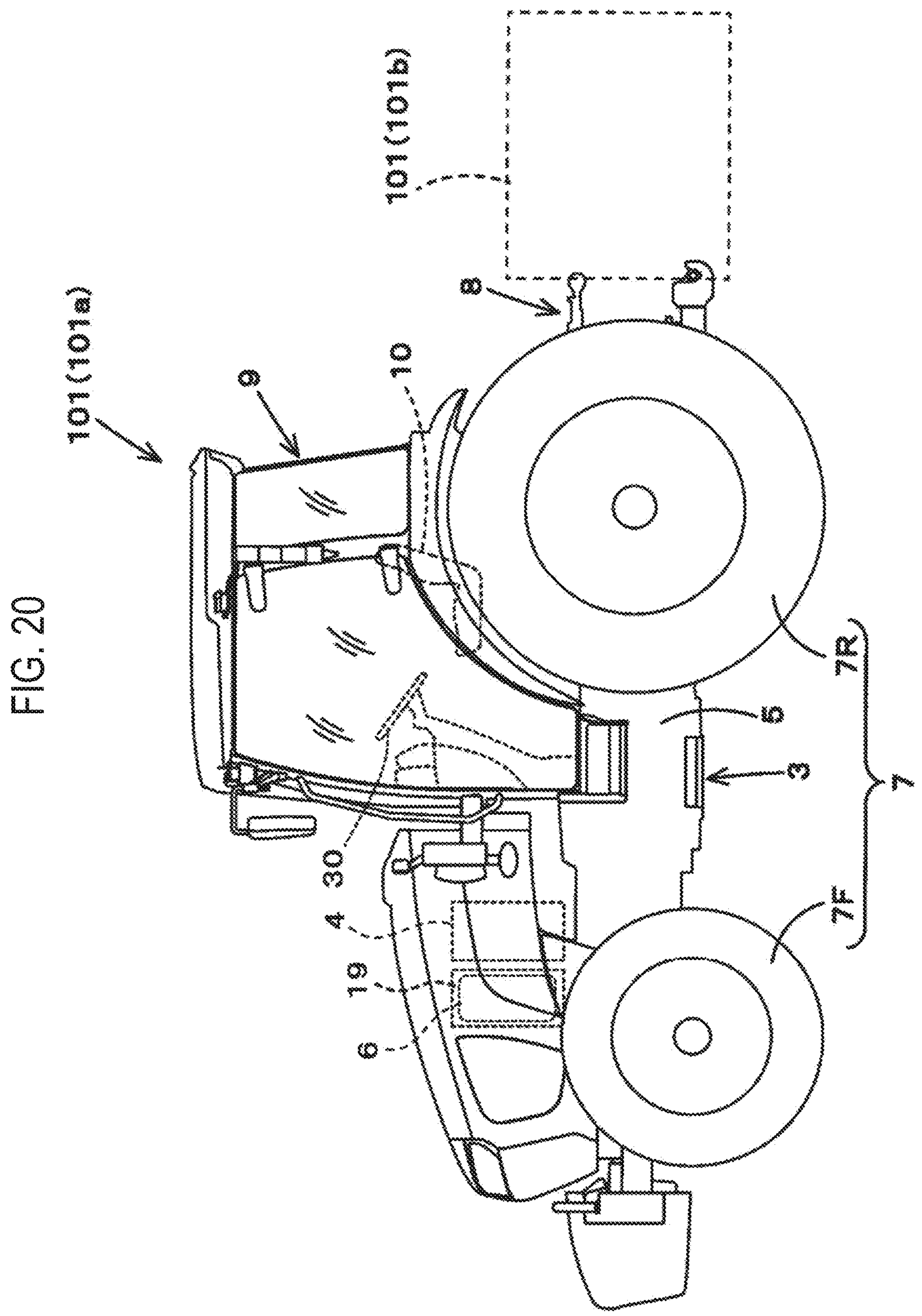
FIG. 20 is an overall view of the working machine.

FIG. 20 is a side view showing a tractor which is one of the agricultural machines 101*a*, and the implement 101*b* mountable to the tractor. Hereinafter, a front side of a driver seated on a driver seat 10 of the tractor will be described as a front side, a rear side of the driver will be described as a rear side, a left side of the driver will be described as a left side, and a right side of the driver will be described as a right side. In addition, a horizontal direction, which is a direction orthogonal to a front-rear direction of the tractor, will be described as a vehicle body width direction.

As shown in FIG. 20, the tractor (agricultural machine 101*a*) includes a vehicle body 3, a prime mover 4, a transmission device 5, and a battery (storage) 6. The vehicle body 3 includes a traveling device 7 and can travel. The traveling device 7 is a device including front wheels 7F and rear wheels 7R. The front wheel 7F may be a tire type or a crawler type. The rear wheel 7R may also be a tire type or a crawler type. In the present example embodiment, the prime mover 4 is an electric motor. The prime mover 4 is driven by electric energy (energy source) supplied from the battery 6. The prime mover 4 and the battery 6 are disposed at a front portion of the vehicle body 3, and the battery 6 is attachable to and detachable from a battery mounting portion 19 included in the vehicle body 3 (see FIG. 4). The battery 6 mounted on the battery mounting portion 19 is replaceable, and details thereof are described below. The transmission device 5 can switch a propulsive force of the traveling device 7 by shifting, and can switch forward movement and backward movement of the traveling device 7. The driver seat 10 is provided at a rear portion of the vehicle body 3. A steering wheel 30 is provided at the front of the driver seat 10.

In addition, a coupling portion including a three-point link mechanism or the like is provided at the rear portion of the vehicle body 3. The coupling portion is a lifting device 8 to and from which the working device (implement) 101*b* is attachable and detachable and which enables the working device (implement) 101*b* to travel. The implement 101*b* is coupled to the lifting device 8, enabling the vehicle body 3 to tow the implement 101*b*. Note that the coupling portion may be a towing device that does not lift and lower the implement 101*b*. The implement 101*b* is a tilling device for tilling, a ridging device for ridging, a planting device for planting crops, a fertilizer spreading device for spreading a fertilizer, a pesticide spreading device for spreading a pesticide, a harvesting device for harvesting, a mowing device for mowing grass or the like, a distributing device for distributing grass or the like, a grass gathering device for gathering grass or the like, and a shaping device for shaping grass or the like.

Figure 2:
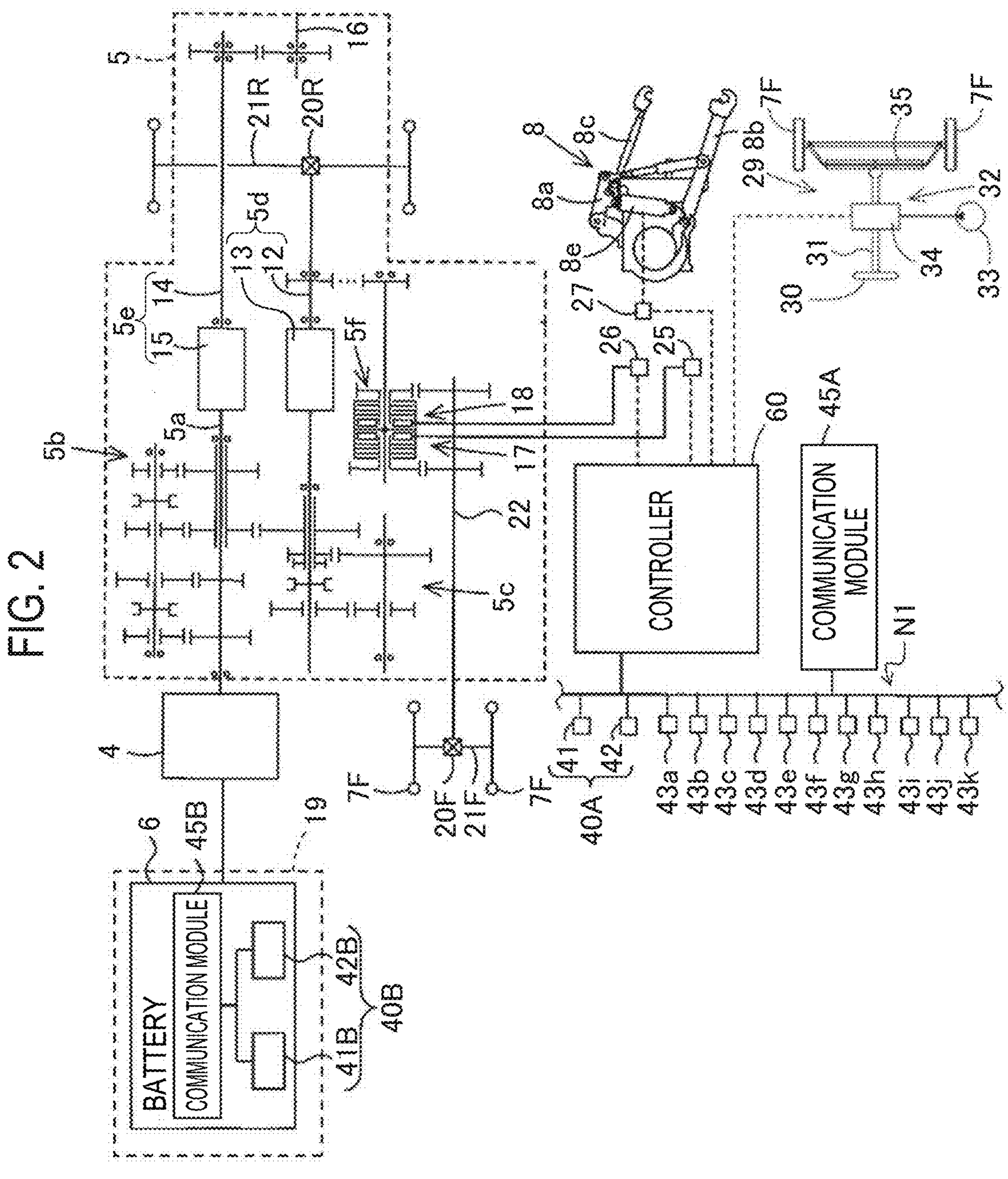
FIG. 2 is a functional block diagram of an electronic device included in each of a working machine and a battery.

As shown in FIG. 2, the transmission device 5 includes a main shaft (propulsion shaft) 5*a*, a main transmission 5*b*, an auxiliary transmission 5*c*, a shuttle 5*d*, a PTO power transmission 5*e*, and a front transmission 5*f*. The propulsion shaft 5*a* is rotatably supported by a housing case (transmission case) of the transmission device 5, and power from a crankshaft of the prime mover 4 is transmitted to the propulsion shaft 5*a*. The main transmission 5*b* includes a plurality of gears and a shifter that changes connection of the gears. The main transmission 5*b* changes and outputs (shifts) rotation input from the propulsion shaft 5*a* by appropriately changing a connection (meshing) of the plurality of gears with the shifter.

Similarly to the main transmission 5*b*, the auxiliary transmission 5*c* includes a plurality of gears and a shifter that changes connection of the gears. The auxiliary transmission 5*c* changes and outputs (shifts) rotation input from the main transmission 5*b* by appropriately changing a connection (meshing) of the plurality of gears with the shifter. The shuttle 5*d* includes a shuttle shaft 12 and a forward/backward switch 13. The power output from the auxiliary transmission 5*c* is transmitted to the shuttle shaft 12 via a gear or the like. The forward/backward switch 13 may include, for example, a hydraulic clutch, and switches a rotation direction of the shuttle shaft 12, that is, forward movement and backward movement of the tractor by being turned on and off. The shuttle shaft 12 is connected to a rear wheel differential device 20R. The rear wheel differential device 20R rotatably supports a rear axle 21R to which the rear wheels 7R are attached.

The PTO power transmission 5*e* includes a PTO propulsion shaft 14 and a PTO clutch 15. The PTO propulsion shaft 14 is rotatably supported, and can transmit power from the propulsion shaft 5*a*. The PTO propulsion shaft 14 is connected to the PTO shaft 16 via a gear or the like. The PTO clutch 15 may be, for example, a hydraulic clutch, and is switched between a state in which the power of the propulsion shaft 5*a* is transmitted to the PTO propulsion shaft 14 and a state in which the power of the propulsion shaft 5*a* is not transmitted to the PTO propulsion shaft 14 by being turned on and off.

The front transmission 5*f* includes a first clutch 17 and a second clutch 18. The first clutch 17 and the second clutch 18 can transmit the power from the propulsion shaft 5*a*, and for example, the power of the shuttle shaft 12 is transmitted via a gear and a transmission shaft. The power from the first clutch 17 and the second clutch 18 can be transmitted to a front axle 21F via a front transmission shaft 22. Specifically, the front transmission shaft 22 is connected to a front wheel differential device 20F, and the front wheel differential device 20F rotatably supports the front axle 21F to which front wheels 7F are attached.

The first clutch 17 and the second clutch 18 may be a hydraulic clutch or the like. An oil passage is connected to the first clutch 17, and the oil passage is connected to a first operation valve 25 to which hydraulic oil discharged from a hydraulic pump is supplied. The first clutch 17 is switched between a connected state and a disconnected state depending on an opening degree of the first operation valve 25. An oil passage is connected to the second clutch 18, and a second operation valve 26 is connected to the oil passage. The second clutch 18 is switched between the connected state and the disconnected state depending on an opening degree of the second operation valve 26. The first operation valve 25 and the second operation valve 26 are, for example, solenoid valve equipped two-position switching valves, and are switched to the connected state or the disconnected state by exciting or demagnetizing a solenoid of the solenoid valve.

In a case where the first clutch 17 is in the disconnected state and the second clutch 18 is in the connected state, the power of the shuttle shaft 12 is transmitted to the front wheel 7F through the second clutch 18. As a result, the front wheels 7F and the rear wheels 7R are driven by the power to engage four-wheel drive (4WD), and rotational speeds of the front wheel 7F and the rear wheel 7R become substantially the same (4WD constant-speed state). On the other hand, in a case where the first clutch 17 is in the connected state and the second clutch 18 is in the disconnected state, the four-wheel drive is engaged, and the rotational speed of the front wheel 7F becomes higher than the rotational speed of the rear wheel 7R (4WD speed-up state). In addition, in a case where the first clutch 17 and the second clutch 18 are in the disconnected state, the power of the shuttle shaft 12 is not transmitted to the front wheel 7F, and thus, two-wheel drive (2WD) in which the rear wheels 7R are driven by the power is engaged.

Figure 3:
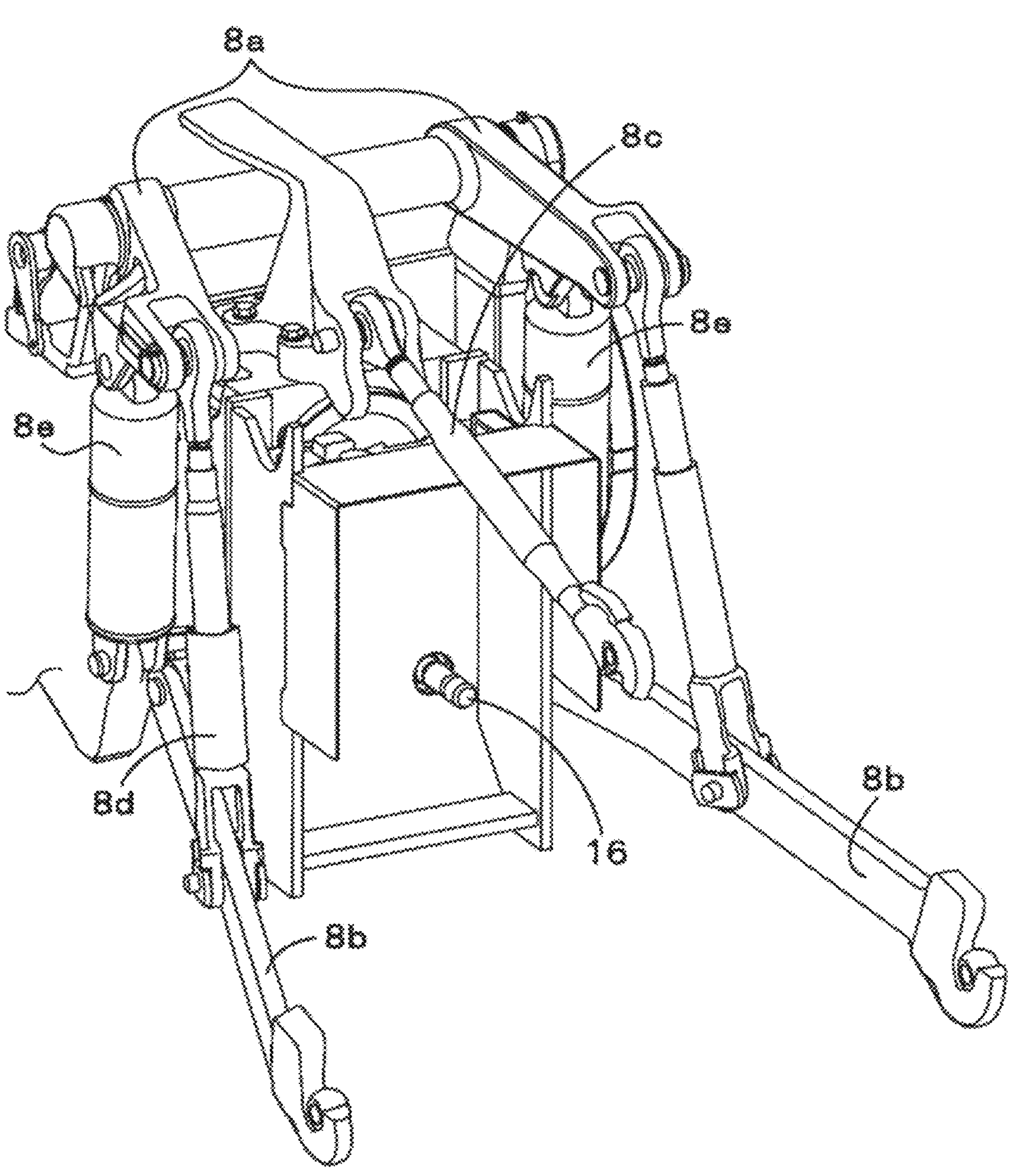
FIG. 3 is a perspective view of a lifting device included in the working machine.

As shown in FIGS. 2 and 3, the lifting device 8 includes a lift arm 8*a*, a lower link 8*b*, a top link 8*c*, a lift rod 8*d*, and a lift cylinder 8*e*. A front end portion of the lift arm 8*a* is swingably supported upward or downward on a rear upper portion of the case (transmission case) that houses the transmission device 5. The lift arm 8*a* swings (is lifted and lowered) by driving of the lift cylinder 8*e*. The lift cylinder 8*e* may be a hydraulic cylinder. The lift cylinder 8*e* is connected to a hydraulic pump via a control valve 27. The lift cylinder 8*e* is switched between the connected state and the disconnected state depending on an opening degree of the control valve 27. The control valve 27 is, for example, a solenoid valve equipped two-position switching valve, and is switched to the connected state or the disconnected state by exciting or demagnetizing a solenoid of the solenoid valve. When the control valve 27 is in the connected state, the lift cylinder 8*e* is driven (expanded and contracted) by the hydraulic pump, and when the control valve 27 is in the disconnected state, the driving of the lift cylinder 8*e* is restricted (locked).

A front end portion of the lower link 8*b* is swingably supported upward or downward on a rear lower portion of the transmission device 5. A front end portion of the top link 8*c* is swingably supported upward or downward on a rear portion of the transmission device 5 above the lower link 8*b*. The lift rod 8*d* couples the lift arm 8*a* and the lower link 8*b*. The implement 101*b* is coupled to a rear portion of the lower link 8*b* and a rear portion of the top link 8*c*. When the lift cylinder 8*e* is driven (expanded and contracted), the lift arm 8*a* is lifted and lowered, and the lower link 8*b* coupled to the lift arm 8*a* via the lift rod 8*d* is lifted and lowered. As a result, the implement 101*b* swings upward or downward (is lifted or lowered) with a front portion of the lower link 8*b* as a fulcrum. When the driving of the lift cylinder 8*e* is restricted, the lifting and lowering of the implement 101*b* is also locked.

Figure 4:
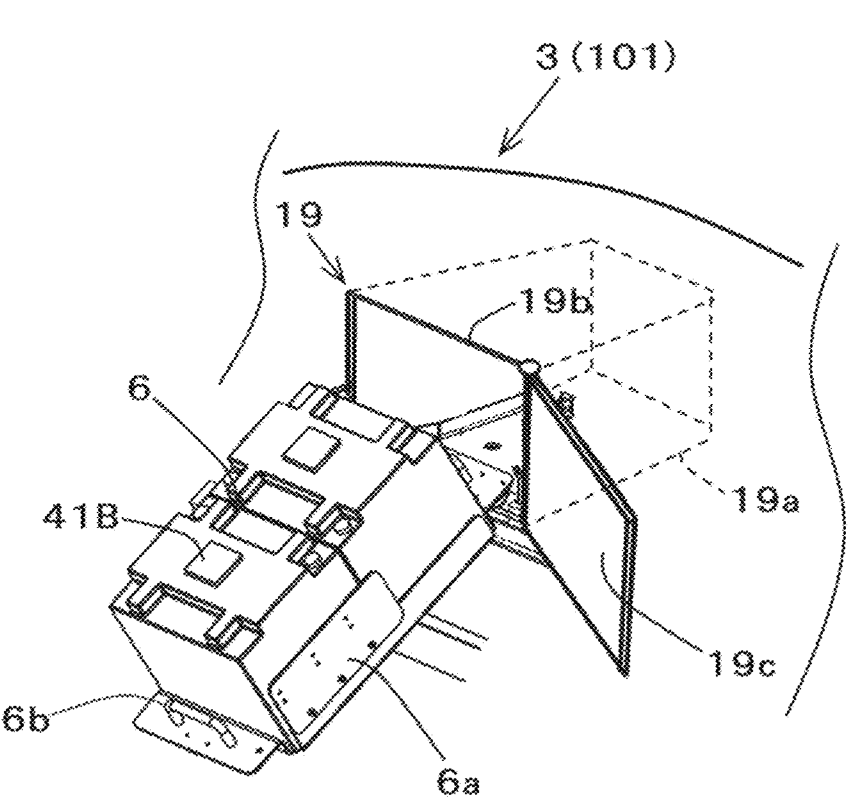
FIG. 4 is a perspective view of a battery mounting portion included in the working machine and a view for explaining an operation when replacing the battery.

As shown in FIG. 4, the battery 6 includes a battery pack and an electronic component (a relay, a fuse, or the like) inside a rectangular or substantially rectangular parallelepiped casing. The battery pack includes a plurality of battery modules. The battery module includes a plurality of cells. The battery 6 is capable of charging and discharging electric energy, specifically, a lithium ion battery. The battery 6 is held by a holder 6*a* from the outside of the casing, and a grip portion 6*b* is provided at a front side end portion of the holder 6*a*. The battery mounting portion 19 of the vehicle body 3 includes a housing portion 19*a* that is a space capable of housing the entire battery 6, an opening 19*b* provided on a front side of the housing portion 19*a* in the vehicle width direction, and a flap type lid portion 19*c* capable of closing the opening 19*b*. Normally, in a state in which the battery 6 is housed in the housing portion 19*a*, the opening 19*b* is closed by the lid portion 19*c*, and electric power can be supplied from the battery 6 to the tractor.

In a case of replacing the battery 6, the opening 19*b* is exposed by opening the lid portion 19*c*. By pulling the holder 6*a* toward a front side while gripping the grip portion 6*b* of the battery 6 being mounted, the battery 6 is taken out from the housing portion 19*a* while being slid toward the front side in the vehicle width direction. A back side end portion of the new replacement battery 6 is inserted into the empty housing portion 19*a* through the opening 19*b*. Next, the holder 6*a* is pushed toward a back side while gripping the grip portion 6*b* of the new replacement battery 6, and the new replacement battery 6 is slid toward the back side in the vehicle width direction. Then, after the entire new replacement battery 6 is housed in the housing portion 19*a*, the opening 19*b* is closed by closing the lid portion 19*c*. As described above, the battery 6 is replaced. The configurations of the battery 6 and the battery mounting portion 19 are examples, and any configuration may be adopted as long as the battery 6 can be mounted on and separated from the battery mounting portion 19.

In the present example embodiment, the battery 6 is replaced. However, instead, a package capable of storing the energy source may be replaced. As the package, for example, a hydrogen tank, a liquified petroleum gas (LPG) tank, or the like may be used. In a case where the hydrogen tank is loaded, for example, a fuel cell that generates electric power with hydrogen and oxygen in the air may be mounted on the tractor, and hydrogen from the tank may be supplied to the fuel cell. In a case where the LPG tank is loaded, for example, a generator that generates electric power by a gas engine may be mounted on the tractor, and gas from the tank may be supplied to the gas engine.

As shown in FIG. 2, the tractor includes a steering device 29. The steering device 29 includes a steering wheel 30, a rotation shaft (steering shaft) 31 that rotates with the rotation of the steering wheel 30, and an assist mechanism (power steering mechanism) 32 that assists the steering of the steering wheel 30. The assist mechanism 32 includes a hydraulic pump 33, a control valve 34 to which hydraulic oil discharged from the hydraulic pump 33 is supplied, and a steering cylinder 35 operated by the control valve 34. The control valve 34 may be a solenoid valve that operates based on a control signal. The control valve 34 may be, for example, a three-position switching valve that can be switched by movement of a spool or the like. The control valve 34 can also be switched by steering of the steering shaft 31. The steering cylinder 35 is connected to an arm (knuckle arm) that changes an orientation of the front wheel 7F.

Therefore, when the steering wheel 30 is operated, a switching position and an opening degree of the control valve 34 are switched according to the steering wheel 30, and a steering direction of the front wheel 7F can be changed by expanding and contracting the steering cylinder 35 to the left or right according to the switching position and the opening degree of the control valve 34. Note that the steering device 29 described above is an example, and is not limited to the above-described configuration.

As shown in FIG. 2, the tractor includes a positioning device 40A. The positioning device 40A can detect its own position (positioning information including latitude and longitude) by a satellite positioning system (positioning satellite) such as D-GPS, GPS, GLONASS, BeiDou, Galileo, or Michibiki. That is, the positioning device 40A receives a satellite signal (a position of the positioning satellite, a transmission time, information, correction or the like) transmitted from the positioning satellite, and detects a position (for example, latitude and longitude) based on the satellite signal. The positioning device 40A includes a reception device 41 and an inertial measurement unit (IMU) 42. The reception device 41 is a device that includes an antenna or the like and receives the satellite signal transmitted from the positioning satellite, and is attached to the vehicle body 3 separately from the inertial measurement unit 42. In the present example embodiment, the reception device 41 is attached to a cabin 9 provided in the vehicle body 3. Note that an attachment location of the reception device 41 is not limited to that in the example embodiment.

The inertial measurement unit 42 includes an acceleration sensor that detects an acceleration, a gyro sensor that detects an angular velocity, and the like. The inertial measurement unit 42 is provided below the vehicle body 3, for example, the driver seat 10, and can detect a roll angle, a pitch angle, a yaw angle, and the like of the vehicle body 3.

As shown in FIG. 2, the tractor includes a communication module 45A. The communication module 45A is connected to the positioning device 40A, a controller 60, an operator or actuator (a lever, a switch, a dial, or the like), and sensors via an in-vehicle communication network N1, and an electric signal is input to the communication module 45A. The communication module 45A may be configured or programmed to communicate with an external network (outside) different from the in-vehicle communication network N1. The communication module 45A can be configured or programmed to perform radio communication by, for example, wireless fidelity (Wi-Fi) (registered trademark) of the IEEE 802.11 series which is a communication standard, Bluetooth (registered trademark) low energy (BLE), low power wide area (LPWA), low-power wide-area network (LPWAN), or the like. Furthermore, the communication module 45A can be configured or programmed to perform radio communication by, for example, a mobile phone communication network, a data communication network, or the like. The communication module 45A transmits a vehicle body position (a position of the tractor) detected by the positioning device 40A to the monitoring computer 100. In addition, the communication module 45A transmits, to the monitoring computer 100, a working machine monitoring signal to monitor whether or not the working machine 101 is in an area, a battery monitoring signal to monitor whether or not the battery 6 is in the area, and a battery monitoring cancellation signal to cancel monitoring of the battery 6.

As shown in FIG. 2, the battery 6 includes a positioning device 40B. The positioning device 40B has a configuration similar to that of the positioning device 40A. That is, the positioning device 40B receives a satellite signal (a position of the positioning satellite, a transmission time, correction information, or the like) transmitted from the positioning satellite, and detects a position (for example, latitude and longitude) based on the satellite signal. The positioning device 40B includes a reception device 41B and an inertial measurement unit 42B, and obtains the position by the reception device 41 and the inertial measurement unit 42. The reception device 41B is a device that includes an antenna or the like and receives the satellite signal transmitted from the positioning satellite, and is attached to the battery 6 separately from the inertial measurement unit 42B. In the present example embodiment, the reception device 41B is attached to the outer surface of the battery 6. Note that an attachment location of the reception device 41B is not limited to that in the present example embodiment.

The battery 6 includes a communication module 45B. The communication module 45B can be configured or programmed to communicate with an external network (outside) different from the in-vehicle network N1. The communication module 45B can be configured or programmed to perform radio communication by, for example, wireless fidelity (Wi-Fi) (registered trademark) of the IEEE 802.11 series which is a communication standard, Bluetooth (registered trademark) low energy (BLE), low power wide area (LPWA), low-power wide-area network (LPWAN), or the like. Furthermore, the communication module 45B can be configured or programmed to perform radio communication by, for example, a mobile phone communication network, a data communication network, or the like. The communication module 45B transmits a position (a position of the battery 6) detected by the positioning device 40B to the monitoring computer 100. In the present example embodiment, the positioning device 40B and the communication module 45B are provided in each of the battery 6 mounted on the tractor and the battery 6 that is not mounted on the tractor, that is, the new replacement battery 6 and the used battery 6. The electric energy is supplied to the positioning device 40B and the communication module 45B from the battery 6 in which the positioning device 40B and the communication module 45B are provided. That is, in a case where the electric energy of the battery 6 remains, the detected position of the battery 6 can be transmitted to the monitoring computer 100.

As shown in FIG. 2, the tractor includes the controller 60. The controller 60 may include a computer (a central processing unit (CPU) or the like), a storage (memory), and the like, and may be configured or programmed to perform predetermined control based on a program stored in the storage. More specifically, the controller 60 be configured or programmed to control a traveling system or work system of the tractor based on an operation signal when the operator or actuator (the lever, the switch, the dial, or the like) installed around the driver seat 10 is operated, detection signals of various sensors loaded on the vehicle body 3, and the like.

In a case where a shuttle lever 43*a* to switch forward movement or backward movement of the vehicle body 3 is operated to switch to forward movement, the controller 60 is configured or programmed to switch the forward/backward switch 13 to forward movement to move the vehicle body 3 forward. In addition, in a case where the shuttle lever 43*a* is operated to switch to backward movement, the controller 60 is configured or programmed to switch the forward/backward switch 13 to backward movement to move the vehicle body 3 backward.

In a case where an ignition switch 43*b* is operated to be turned on, the controller 60 starts the prime mover 4 through predetermined processing, and in a case where the ignition switch 43*b* is operated to be turned off, the controller 60 stops the driving of the prime mover 4.

In a case where a PTO switch 43*c* is operated during the driving of the prime mover 4, the controller 60 switches a position of the PTO clutch 15 to one of a neutral position, an ON position, and an OFF position to turn on and off the driving of the PTO shaft 16. In a case where a PTO shift lever 43*d* is operated, the controller 60 changes a rotation speed (referred to as a PTO rotation speed) of the PTO shaft 16 by switching a PTO shift gear embedded in the transmission device 5.

In a case where a shift changeover switch 43*e* is switched to automatic shift, the controller 60 automatically switches any one of the main transmission 5*b* or the auxiliary transmission 5*c* according to a state of the tractor, and automatically changes a shift stage (shift level) of the transmission device 5 to a predetermined shift stage (shift level). In a case where the shift changeover switch 43*e* is switched to manual shift, the controller 60 automatically switches any one of the main transmission 5*b* or the auxiliary transmission 5*c* according to a shift stage (shift level) set by a shift lever 43*f* and changes the shift stage of the transmission device 5.

In a case where an accelerator lever 43*g* is operated, the controller 60 changes a vehicle speed (speed) of the vehicle body 3 by changing a rotation speed of the prime mover 4 (referred to as a prime mover rotation speed) according to an operation amount of the accelerator lever 43*g*.

In a case where a hydraulic lever 43*h* is operated in a lifting direction (lifting side) during the driving of the prime mover 4, the controller 60 is configured or programmed to control the control valve 27 to expand the lift cylinder 8*e* and lift a rear end portion (an end portion adjacent to the implement 101*b*) of the lift arm 8*a*. In a case where the hydraulic lever 43*h* is operated in a lowering direction (lowering side) during the driving of the prime mover 4, the controller 60 is configured or programmed to control the control valve 27 to contract the lift cylinder 8*e* and lower the rear end portion (the end portion adjacent to the implement 101*b*) of the lift arm 8*a*.

The controller 60 is set to an automated driving mode in a case where a driving changeover switch 43*i* is operated to be turned on, and is set to a manual driving mode in a case where the driving changeover switch 43*i* is operated to be turned off. In a case where the automated driving mode is set, the controller 60 performs automated driving of the tractor. Under the automated driving situation, the controller 60 automatically changes a rotation angle of the steering shaft (rotation shaft) 31 based on a deviation between the detected vehicle body position and a set scheduled travel route. In addition, the controller 60 automatically changes the shift stage of the transmission device 5, the rotation speed of the prime mover 4, and the like such that the current vehicle speed matches a vehicle speed corresponding to the scheduled travel route. As a result, the vehicle body 3 can perform automated driving on the scheduled travel route.

The controller 60 acquires a remaining level of the battery 6 being mounted based on a potential detected by a potential sensor 43*j* of the battery 6, the rotation speed of the prime mover 4, the vehicle speed of the vehicle body 3, and the like. In a case where the controller 60 determines that replacement of the battery 6 being mounted is necessary based on the acquired remaining level of the battery 6, the controller 60 controls the communication module 45A to transmit the battery monitoring cancellation signal to the monitoring computer 100. When the controller 60 determines that the mounted battery 6 has been replaced with the replacement battery 6 based on the potential detected by the potential sensor 43*j* of the battery 6, the controller 60 controls the communication module 45A to transmit the battery monitoring signal to the monitoring computer 100. A specific example of the transmission of the battery monitoring signal and the battery monitoring cancellation signal based on the potential sensor 43*j* is described below.

In a case where a working machine monitoring switch 43*k* is operated, the controller 60 is configured or programmed to control the communication module 45A to transmit the working machine monitoring signal. The working machine monitoring switch 43*k* may be configured as a switch that can be turned on and off, and the controller 60 may transmit the working machine monitoring signal in a case where the working machine monitoring switch 43*k* is turned on, and transmit, to the monitoring computer 100, a working machine monitoring cancellation signal to cancel the monitoring of the working machine 101 in a case where the working machine monitoring switch 43*k* is turned off.

In the present example embodiment, as described above, the prime mover 4 is driven by the battery 6. As the tractor travels and the work of the working device 101*b* progresses, the remaining charge level of the battery 6 being mounted decreases. In order to continue the work in a farm field, the battery 6 is replaced in the farm field. The replacement of the battery 6 may be performed, for example, in an area A that is outside a work area of a farm field F and is in contact with an agricultural road R (see FIGS. 7, 8, 9, and the like). In particular, in a case where the working device 101*b* is a device using a material or the like, the "area A that is in contact with the agricultural road R" can be an area for replenishing the working device 101*b* with the material. In a case of performing material replenishment, the working machine 101 performing the work is moved to the area A. Similarly, the working machine 101 performing the work may be moved to the area A in order to replace the battery 6. That is, an area for material replenishment can be used as an area for replacement of the battery 6.

In the present example embodiment, it is assumed that the battery 6 that is not mounted is stored in a delivery base (delivery center) away from the farm field F. In the delivery base, it is possible to store the replacement battery 6 to be delivered toward the farm field F, or to charge the used battery 6 collected in the farm field F. The delivery of the replacement battery 6 and the collection of the used battery 6 are performed by a transport vehicle such as a truck that can be loaded with and transport the battery 6. The replacement battery 6 is a battery that is sufficiently charged, for example, a battery whose charge amount is 80% or more in a case where the maximum charge amount of the battery is 100%. Note that the charge amount is not limited to 80% or more.

Figure 8A:
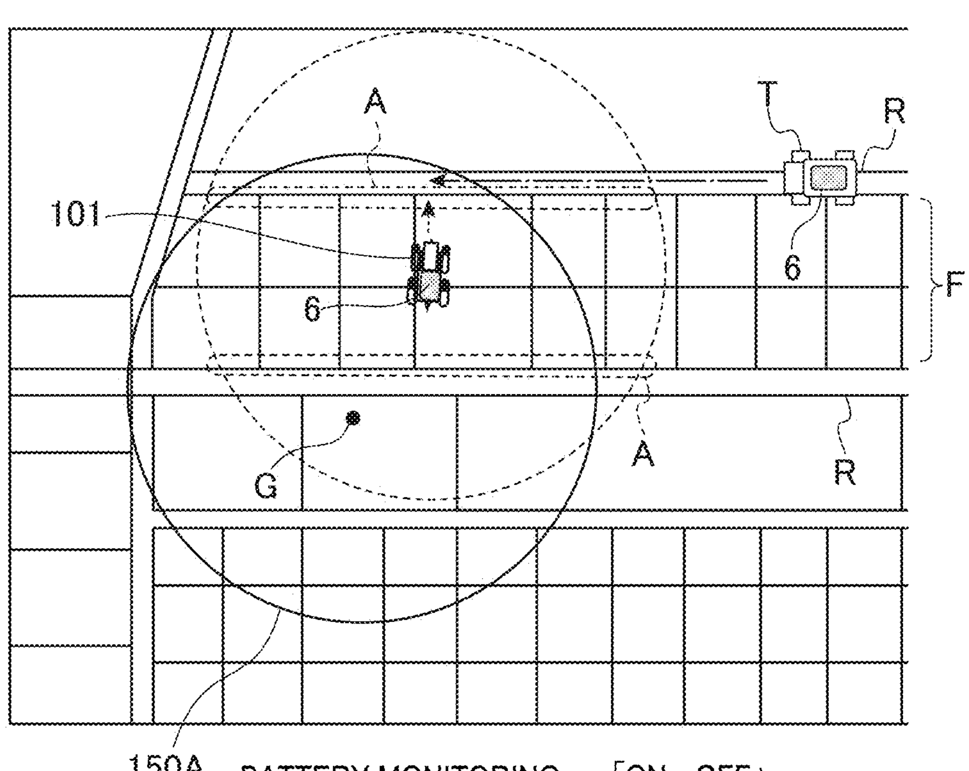
FIGS. 8A, 8B, and 8C are views showing an example of deletion/setting of an area in an operation in which monitoring of the battery is cancelled when delivering the battery from a delivery base to a farm field and monitoring of the battery is resumed by replacing the battery, and a state in which the battery is located inside and outside the area.
Figure 8B:
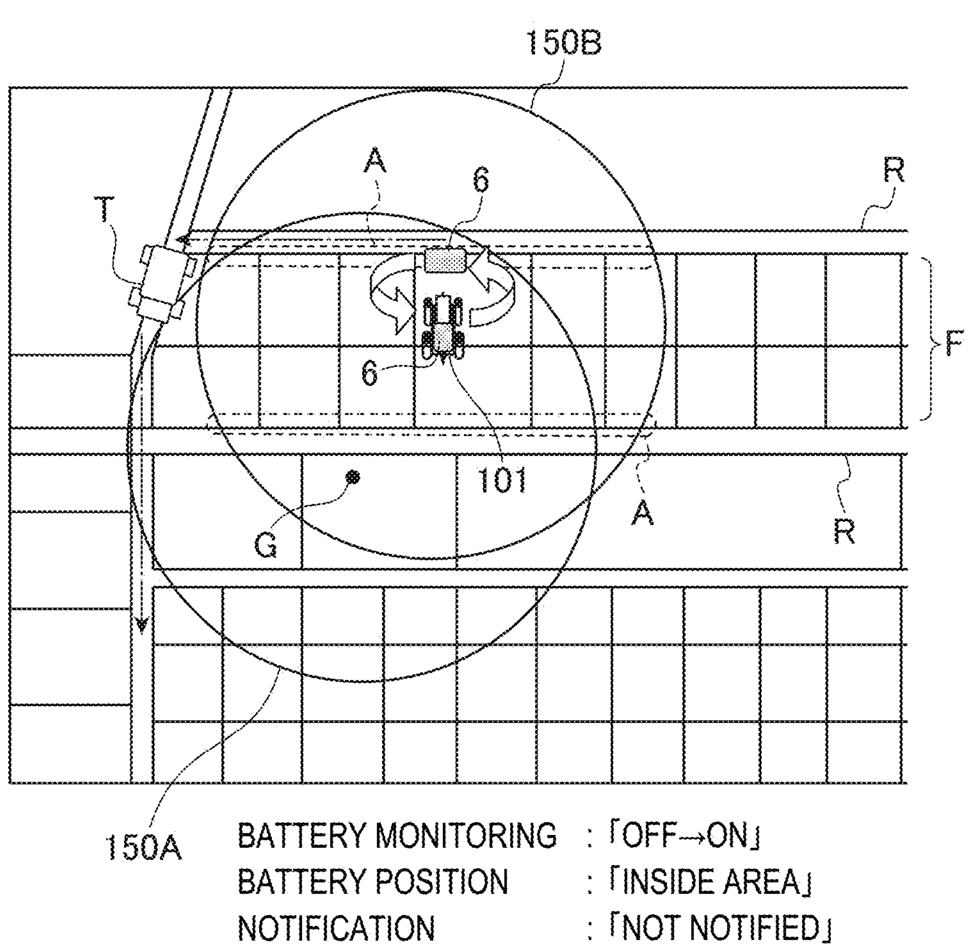

In a case of delivering the replacement battery 6 to the farm field F, for example, the replacement battery 6 stored in the delivery base is loaded on a transport vehicle T, and as shown in FIG. 8A, the transport vehicle T travels from the delivery base toward the farm field F and reaches the area A of the farm field F that is in contact with the agricultural road R. Then, as shown in FIG. 8B, in the area A (for example, the area for material replenishment), the battery 6 loaded on the transport vehicle T is unloaded as the replacement battery 6. On the other hand, the battery 6 separated from the working machine 101 is left as the used battery 6 in the area A, and the replacement battery 6 that has already been left is mounted on the working machine 101. Note that the transport vehicle T after unloading moves to another farm field and collects another battery, and then returns to the delivery base.

Figure 9:
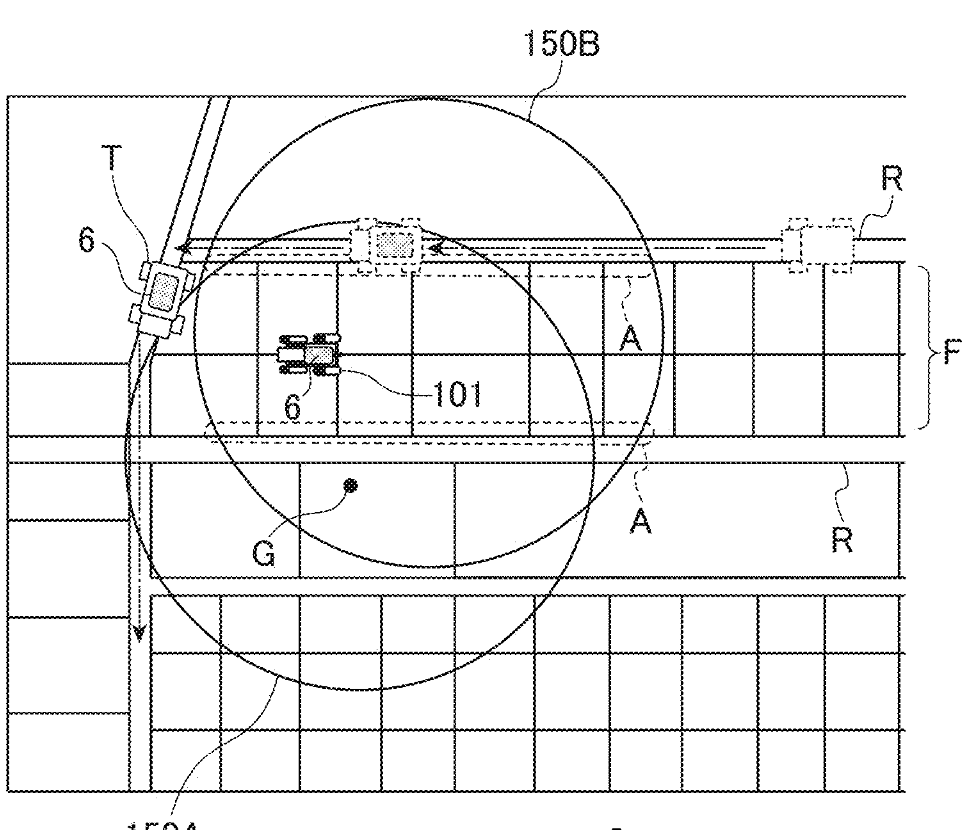
FIG. 9 is a view showing an example of deletion of the area in the operation in which monitoring of the battery is cancelled when collecting the battery from the farm field.

In a case of collecting the used battery 6 from the area A, as shown in FIG. 9, the used battery 6 that has been left is loaded on the transport vehicle T that has reached the area A via the agricultural road R, and the transport vehicle T travels toward the delivery base. The unloading of the battery 6 from the transport vehicle T and the loading of the battery 6 on the transport vehicle T may be performed by a driver of the transport vehicle T. The separation of the mounted battery 6 from the working machine 101 and the mounting of the replacement battery 6 on the working machine 101 may be performed by the driver of the tractor, or may be performed by the driver of the transport vehicle T as a service of the delivery base.

As shown in FIG. 1, a computer 106 is installed in the delivery base (delivery center). The computer 106 and the communication module 45A of the working machine (tractor) 101 can communicate with each other via a network or the like. The computer 106 acquires various information (hereinafter, referred to as delivery information) regarding delivery, and controls various equipment and devices installed in the delivery base (delivery center) based on the acquired delivery information. The delivery information includes an instruction signal (request signal) to request delivery of the battery 6, an instruction signal (collection signal) to request collection of the battery 6, the vehicle body position of the working machine (tractor) 101, and the like. The request signal, the collection signal, and the vehicle body position are transmitted from the communication module 45A of the working machine (tractor) 101, for example, and are received (acquired) by the computer 106.

More specifically, during operation of the working machine 101, when the controller 60 determines that the remaining level of the battery 6 being mounted is lower than a predetermined value and replacement of the battery 6 being mounted is necessary, the controller 60 instructs the communication module 45A to transmit the request signal and the vehicle body position, and the communication module 45A transmits the request signal and a vehicle body position to the computer 106 (delivery base). The computer 106 that has received the request signal and the vehicle body position displays information indicating that "there is a battery delivery request" and the vehicle body position on a display 106A such as a monitor of the computer 106. At the delivery base, an operator confirms the above information displayed on the display 106A, and instructs a delivery driver to move toward the farm field corresponding to the vehicle body position and deliver the replacement battery 6.

Further, in a case where the controller 60 determines that the remaining level is restored by mounting of the battery 6 and the mounted battery 6 is replaced with the replacement battery 6 after a potential temporarily becomes zero by the separation of the battery 6 while the working machine 101 is stopped, the controller 60 instructs the communication module 45A to transmit the collection signal and the vehicle body position, and the communication module 45A transmits the collection signal and the vehicle body position to the computer 106 (delivery base). The computer 106 that has received the collection signal and the vehicle body position displays information indicating that "there is a battery collection request" and the vehicle body position on a display 106A such as a monitor of the computer 106. At the delivery base, the user confirms the above information displayed on the display 106A, and instructs the delivery driver to move toward the farm field corresponding to the vehicle body position and collect the used battery 6.

Furthermore, in a case where the automated driving mode is set, the controller 60 controls a steering device 29 and the prime mover 4 to automatically move the tractor to the area A (for example, the area for material replenishment) of the farm field F that is in contact with the agricultural road R and stop in the area A in a case where the controller 60 determines that the remaining level of the battery 6 being mounted is lower than the predetermined value and replacement of the battery 6 being mounted is necessary during the operation of the working machine 101. In a case where the automated driving mode is not set, the controller 60 performs, for example, control to operate a buzzer of the tractor in a case where the controller 60 determines that the remaining level of the battery 6 being mounted is lower than the predetermined value and replacement of the battery 6 being mounted is necessary during the operation of the tractor. As a result, the driver of the tractor can be prompted to move the tractor to the area A of the farm field F that is in contact with the agricultural road R.

In the present example embodiment, when the battery 6 mounted on the working machine 101 is separated and left in the area A, the battery 6 is replaced such that the energy source to maintain the driving of the positioning device 40B and the communication module 45B remains. As a result, the position of the battery 6 is transmitted from the battery 6 left in the area A to the monitoring computer 100, and the monitoring of the battery 6 by the monitoring computer 100 is maintained.

As described above, in order to replace the battery 6 in the area A of the farm field F that is in contact with the agricultural road R, the replacement battery 6 delivered is left in the area A before replacement, and the used battery 6 scheduled to be collected is left after replacement. It is preferable to monitor the batteries 6 for theft prevention of the like. Therefore, the monitoring computer 100 monitors the working machine 101 and the battery 6.

Figure 5:
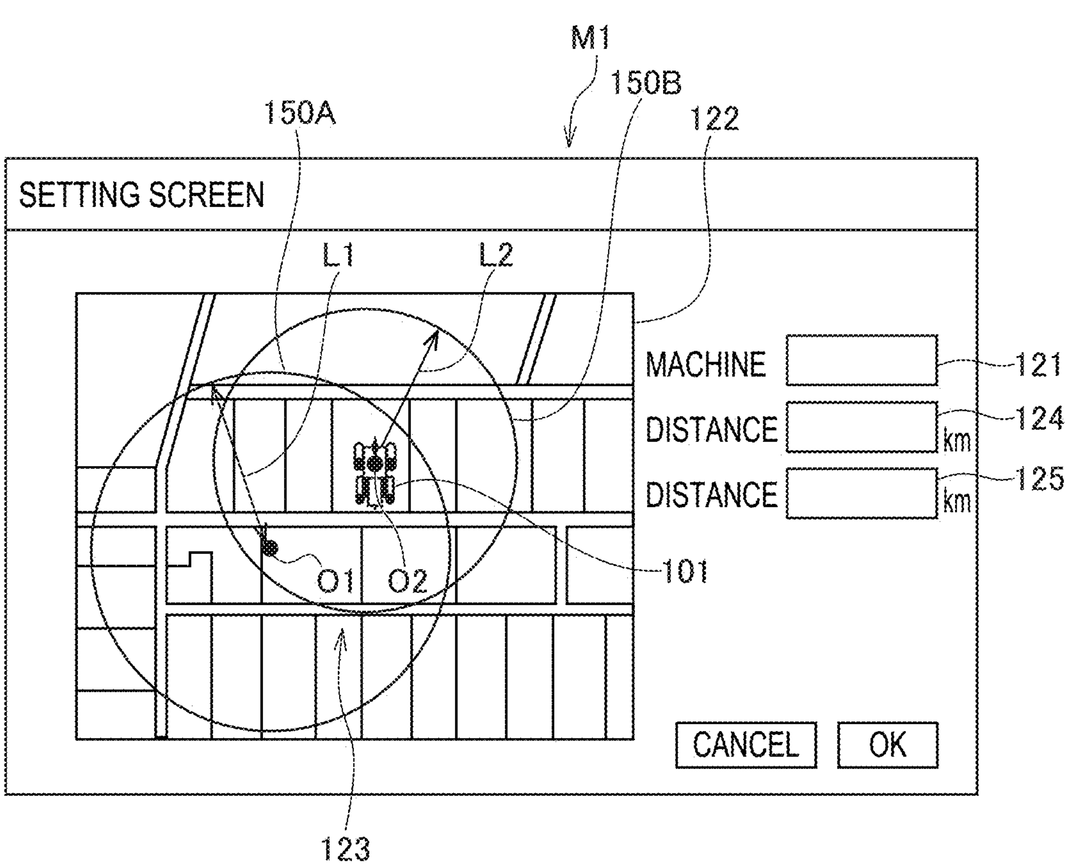
FIG. 5 is a view showing an example of a setting screen displayed on a display of a computer.

As shown in FIG. 1, the monitoring computer (server) 100 is configured or programmed to include an area setter 110 and an area storage 111. The area setter 110 may include an electric/electronic circuit provided in the monitoring computer 100, a program stored in the monitoring computer 100, and the like. The area storage 111 may include a nonvolatile memory or the like. The area setter 110 is configured or programmed to set each of an area 150A of the working machine 101 and an area 150B of the battery 6. Specifically, as shown in FIG. 1, when an installation type computer 105 different from the monitoring computer 100 is connected to the monitoring computer 100 and a predetermined operation is performed in the installation type computer 105, a setting screen M1 is displayed on a display 105A such as a monitor of the installation type computer 105 as shown in FIG. 5. In the present example embodiment, the computer 105 is of an installation type, and may be a portable type computer such as a smartphone, a tablet, or a notebook computer.

The setting screen M1 is configured or programmed to include a working machine input section 121 to input information to the working machine 101, a map display section 122 to display a map, a pointer 123 to select an arbitrary point on the map, a working machine distance input section 124 to input a distance L1, and a battery distance input section 125 to input a distance L2. Identification information to identify the working machine 101 can be input to the working machine input section 121. The identification information is various information such as a serial number, a name, a model number, a model, and a manufacturing number of the working machine 101. The map display section 122 is a portion that displays the map including a work site such as a road, an agricultural road, or a farm field, a building, and the like. The map may be, for example, a map acquired from a map providing company that provides map data, or may be a map created by the installation type computer 105 or the like, and is not limited thereto.

The area 150A can be set for the working machine 101 by inputting working machine identification information, a center O1, and the distance L1 on the setting screen M1. Although the center of the area 150A is selected by the pointer 123 in the above-described example embodiment, a plurality of positions (points) on the map may be selected by the pointer 123. In this case, the area setter 110 sets an area surrounded by a plurality of positions (points) as the area 150A.

The area setter 110 is configured or programmed to set the area 150B for the battery 6 based on a position of the working machine 101. Target batteries in the area 150B are the battery 6 being mounted on the tractor and the battery 6 that is not mounted on the tractor, and are the replacement battery 6 and the used battery 6. Specifically, the distance L2 is input on the setting screen M1, and the area setter 110 sets a center O2 and the area 150B having the distance L2 with the vehicle body position transmitted from the communication module 45A as the center O2. Note that the center O2 may be one point corresponding to one vehicle body position transmitted from the communication module 45A at a predetermined timing, or may be sequentially updated according to a change in the vehicle body position when the vehicle body 3 moves in the farm field or the like. In the present example embodiment, the area setter 110 sets the center O2 of the area 150B at the same position as the vehicle body position, but the present invention is not limited thereto. For example, the center O2 of the area 150B may be set at a position spaced apart from the vehicle body position by a predetermined distance.

As shown in FIG. 6, area information (the working machine identification information and information indicating the area 150A and the area 150B) of the tractor and the battery 6 set by the area setter 110 is stored in the area storage 111. Note that the area information shown in FIG. 6 is an example and is not limited.

As shown in FIG. 1, the monitoring computer 100 is configured or programmed to include a first monitoring section 112 and a second monitoring section 113. In a case where the battery 6 is not located in the area 150B set by the area setter 110, the first monitoring section 112 is configured or programmed to monitor the battery 6 by providing a notification for the battery 6. Therefore, the first monitoring section 112 is configured or programmed to include a notifier 112A.

The notifier 112A may include an electric/electronic circuit provided in the monitoring computer 100, a program stored in the monitoring computer 100, and the like. The notifier 112A is configured or programmed to provide a notification for the battery 6 based on whether or not the battery 6 is located in the area 150B determined for the battery 6. As shown in FIGS. 7, 8, and 9, it is assumed that the area 150B is set for the battery 6. In the area 150B, the center O2 and the distance L2 are set such that the vehicle body 3 is located at the center. When the monitoring computer 100 receives the position of the battery 6 transmitted by the communication module 45B of the battery 6, the notifier 112A determines whether or not the position of the battery 6 is in the area 150B. Here, the "batteries 6" are the battery 6 being mounted on the tractor and the battery 6 that is not mounted on the tractor, and are the replacement battery 6 and the used battery 6.

In a case where the working machine 101 (tractor) is not located in the area 150A set by the area setter 110, the second monitoring section 113 is configured or programmed to monitor the working machine 101 by providing a notification for the tractor. Therefore, the second monitoring section 113 is configured or programmed to include a notifier 113A.

The notifier 113A may include an electric/electronic circuit provided in the monitoring computer 100, a program stored in the monitoring computer 100, and the like. The notifier 113A is configured or programmed to a notification for the tractor based on whether or not the tractor is located in the area 150A determined for the working machine 101 (tractor). As shown in FIGS. 7, 8, and 9, it is assumed that the area 150A is set for the tractor. For example, the center O1 and the distance L1 are set such that a garage G is located at the center of the area 150A. When the monitoring computer 100 receives the vehicle body position transmitted by the communication module 45A of the working machine 101, the notifier 113A determines whether or not the vehicle body position is within the area 150A.

Figure 7A:
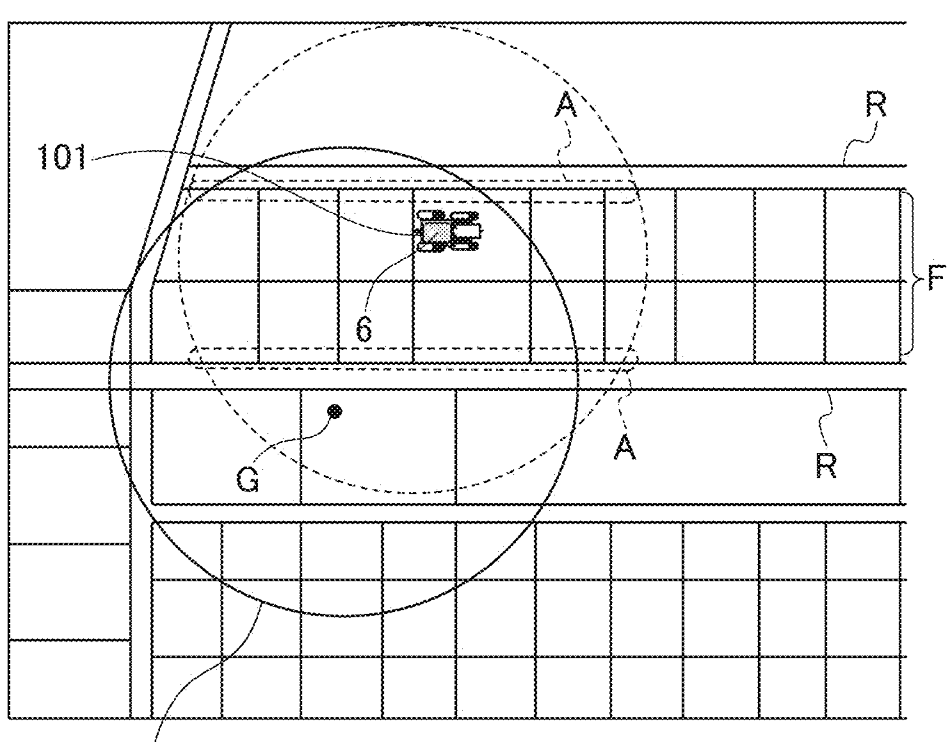
FIGS. 7A and 7B are views showing an example of areas set corresponding to the working machine and the battery, and a state in which the working machine and the battery are located inside and outside each area.

For example, as shown in FIG. 7A, in a case where the battery 6 is being mounted on the working machine 101 (tractor) and the tractor and the battery 6 are being monitored, the notifier 112A does not provide a notification when the position of the battery 6 being mounted is within the area 150B. When the vehicle body position is within the area 150A, the notifier 113A does not provide a notification.

Figure 7B:
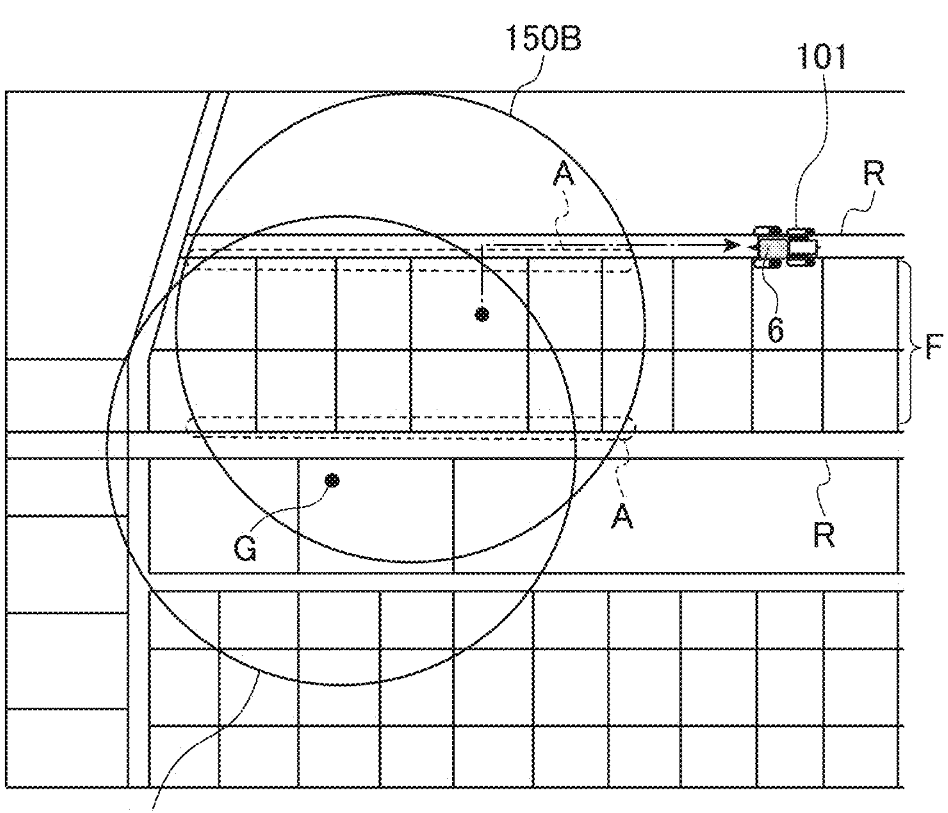

On the other hand, as shown in FIG. 7B, it is assumed that the working machine 101 may deviate from the areas 150A and 150B together with the battery 6 in the state shown in FIG. 7A. In this case, the notifier 112A determines that the position of the battery 6 being mounted is outside the area 150B, and notifies the installation type computer 105 or the like that "the battery is out of the area". In this case, the notifier 113A determines that the vehicle body position is outside the area 150A, and notifies the installation type computer 105 or the like that "the tractor is out of the area". Also in a case where the battery 6 that is not mounted deviates from the area 150B, a similar notification is provided (see FIG. 8C).

That is, the notifier 112A monitors the battery 6 by notifying the installation type computer 105 or the like whether or not the battery 6 is in the area 150B determined corresponding to the battery 6. The notifier 113A monitors the working machine 101 by notifying the installation type computer 105 or the like whether or not the working machine 101 is in the area 150A determined corresponding to the working machine 101. In a case where the battery 6 and the working machine 101 are outside the areas 150B and 150A for a long period of time, it can be determined that there is a possibility that the battery 6 and the working machine 101 have been stolen, and the theft of the battery 6 and the working machine 101 can be prevented by monitoring the battery 6 and the working machine 101.

Monitoring of the battery 6 and monitoring of the working machine 101 are performed by the monitoring computer 100. Incidentally, there is also a case where the battery 6 is not stolen but is intentionally conveyed out of the area 150B during the monitoring. For example, the replacement battery 6 may be delivered from the delivery base to the farm field F or the used battery 6 may be collected from the farm field F in a case where the area 150B is set to include the area A that is in contact with the agricultural road R (see FIGS. 8A and 9).

In such a case, if the battery 6 is monitored, the above-described notification is provided even in a case where the battery 6 is not stolen. As described above, a case where the battery 6 is not stolen but is intentionally located outside the area 150B may also be likely to be erroneously determined as theft. Therefore, when there is a high possibility of confusion with the occurrence of theft, and a user is accustomed to the above-described notification, there is a possibility of overlooking actual theft, and there is a high possibility of deteriorating security.

From the above, it is preferable that the monitoring of the battery 6 can be appropriately started and cancelled. Therefore, in the present example embodiment, the battery monitoring signal and the battery monitoring cancellation signal are transmitted to the monitoring computer 100. Similarly, the working machine monitoring signal is also transmitted to the monitoring computer 100. Hereinafter, transmission of the working machine monitoring signal, the battery monitoring signal, and the battery monitoring cancellation signal will be described.

In a case where the working machine monitoring switch 43*k* is operated in a state in which the battery 6 and the working machine 101 are not monitored, the controller 60 of the tractor controls the communication module 45A to transmit the working machine monitoring signal. The working machine monitoring switch 43*k* may be installed in a console of the cabin, for example, and may be operated by the driver of the tractor.

As shown in FIG. 1, the first monitoring section 112 and the second monitoring section 113 of the monitoring computer 100 are configured or programmed to include a monitoring starter 112B and a monitoring starter 113B, respectively. The monitoring starter 112B and the monitoring starter 113B may include an electric/electronic circuit provided in the monitoring computer 100, a program stored in the monitoring computer 100, and the like. In a case where the working machine 101 is not monitored and the working machine monitoring signal is received, the monitoring starter 113B of the second monitoring section 113 starts monitoring in the area 150A of the working machine 101.

In a case where the battery 6 is not monitored and it is determined that the monitoring of the working machine 101 by the monitoring starter 113B has started, the monitoring starter 112A of the first monitoring section 112 starts monitoring in the area 150B of the battery 6. As described above, the first monitoring section 112 monitors the battery 6 in a case where the working machine 101 is monitored by the second monitoring section 113.

In addition, in a state in which the battery 6 is monitored, the controller 60 of the tractor is configured or programmed to control the communication module 45A to transmit the battery monitoring cancellation signal when the controller 60 determines that the remaining level of the battery 6 being mounted is lower than the predetermined value and replacement of the battery 6 being mounted is necessary during the operation of the working machine 101.

As shown in FIG. 1, the first monitoring section 112 of the monitoring computer 100 is configured or programmed to includes a monitoring terminator 112C. The monitoring terminator 112C may include an electric/electronic circuit provided in the monitoring computer 100, a program stored in the monitoring computer 100, and the like. In a case where the battery 6 is monitored and the battery monitoring cancellation signal is received, the monitoring terminator 112C of the first monitoring section 112 is configured or programmed to delete the set area of the battery 6.

In a state in which the battery 6 is not monitored due to the deletion of the area of the battery 6, the controller 60 of the tractor is configured or programmed to control the communication module 45A to transmit the battery monitoring signal in a case where the controller 60 determines that the remaining level is restored by mounting of the battery 6 and the mounted battery 6 is replaced with the replacement battery 6 after the potential temporarily becomes zero by the separation of the battery 6 while the working machine 101 is stopped.

As shown in FIG. 1, in a case where the battery 6 is not monitored and the battery monitoring signal is received, the monitoring 112A of the first monitoring section 112 starts area setting of the battery 6 by the area setter 110. As a result, the first monitoring section 112 can cancel the monitoring of the battery in a case where the battery 6 to replace the battery 6 mounted on the working machine 101 is conveyed, and the first monitoring section 112 can start (resume) the monitoring of the battery 6 in a case where the battery 6 for replacement is mounted on the working machine 101 while the monitoring is cancelled.

In addition, the first monitoring section 112 maintains the monitoring in a case where the monitoring of the battery 6 is started (resumed), and the first monitoring section 112 cancels the monitoring of the battery 6 in a case where the battery 6 that is not mounted on the working machine 101 is conveyed while the monitoring is maintained. For example, in order to collect the battery 6, when a truck for collection moves from the delivery base to the farm field, the battery monitoring cancellation signal may be transmitted from the computer 106 to the monitoring computer 100 by an operation by the operator of the computer 106 of the delivery base.

Figure 10:
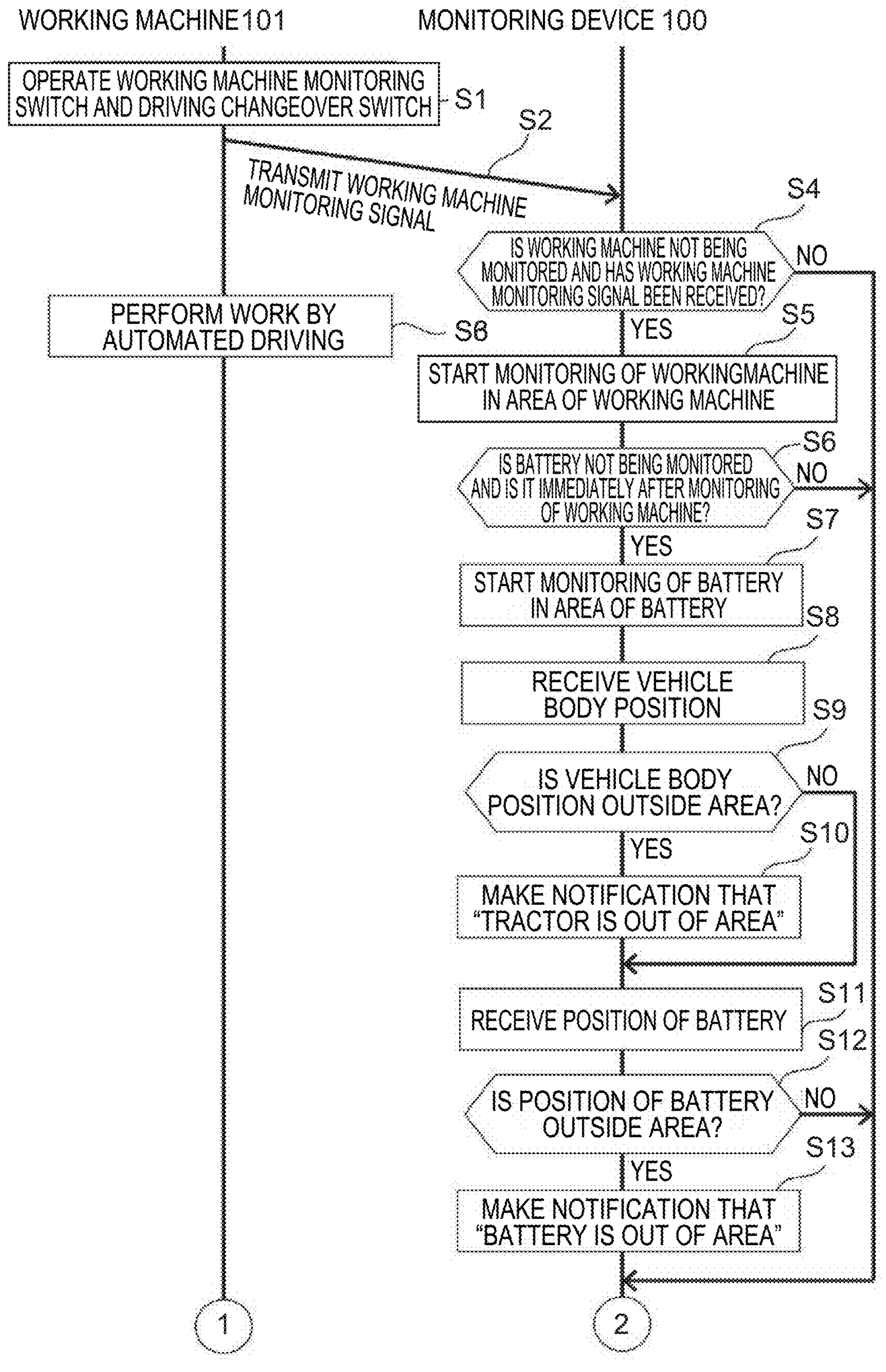
FIG. 10 shows a portion of a flowchart showing a flow of notification based on monitoring start, monitoring cancellation, and monitoring of the battery by the monitoring system.
Figure 11:
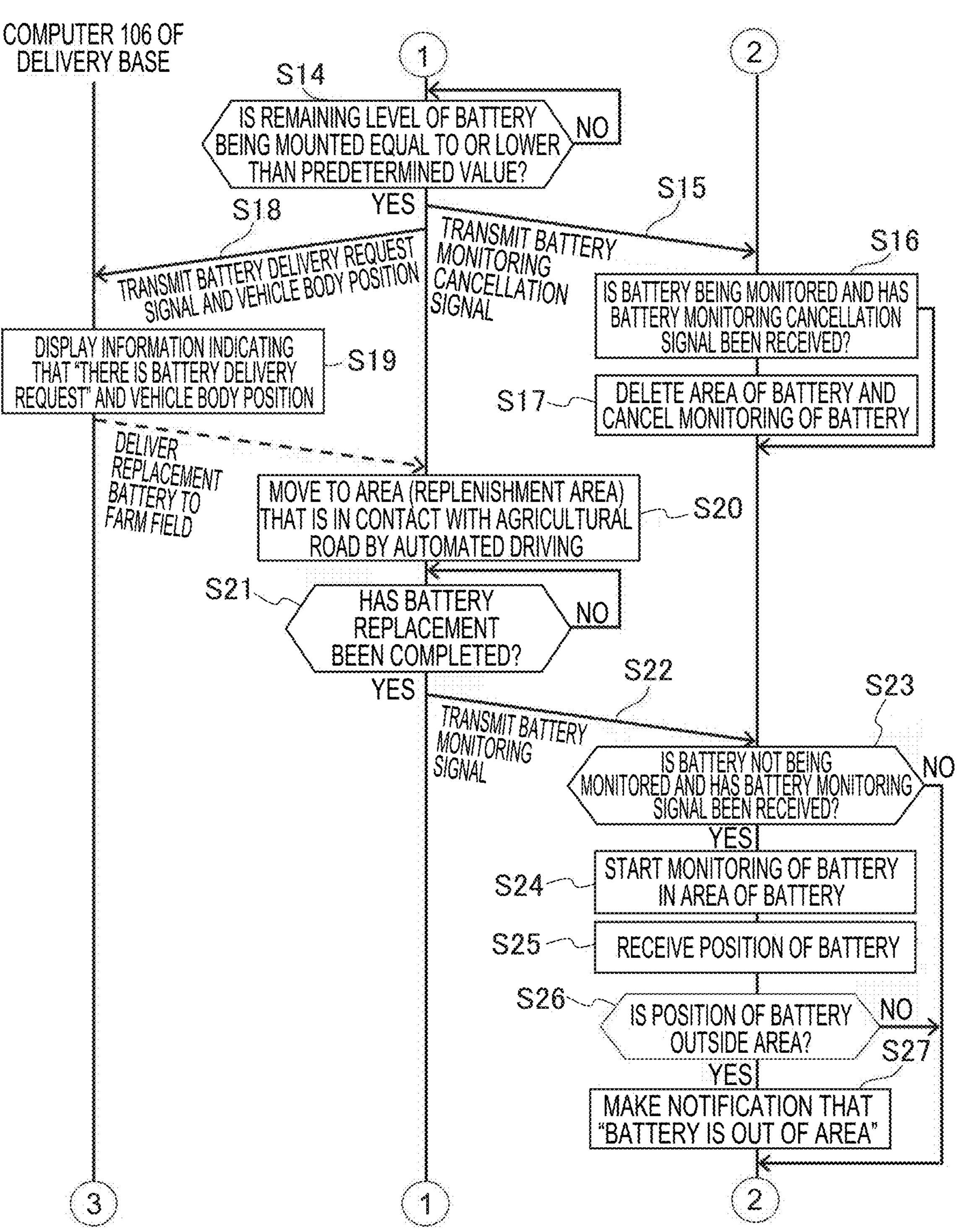
FIG. 11 shows a portion of a flowchart following FIG. 10 showing a flow of the notification based on monitoring start, monitoring cancellation, and notification by monitoring of the battery by the monitoring system.

FIGS. 10, 11, and 12 are flowcharts showing a flow of monitoring start, monitoring cancellation, and notification by monitoring of the battery 6, and also show an operation flow of the working machine 101, the monitoring computer 100, and the computer 106 of the delivery base. At the time of the start of the operation, it is assumed that neither the working machine 101 nor the battery 6 is monitored.

As shown in FIG. 7A, in a case where the working machine 101 performs the work in the farm field F, for example, the working machine 101 moves from the garage G to the farm field F by itself through the agricultural road R. In the working machine 101 that has arrived at the farm field F, the driver operates the working machine monitoring switch 43*k* to turn on the driving changeover switch 43*i* (S1). As a result, the working machine monitoring signal is transmitted from the communication module 45A of the working machine 101 to the monitoring computer 100 and received by the monitoring computer 100 (S2). In addition, the work of the working machine 101 by automated driving is performed, and the remaining level of the battery 6 being mounted decreases as the work progresses (S3).

The second monitoring section 113 (monitoring starter 113B) of the monitoring computer 100 determines whether or not the working machine 101 is not being monitored and whether or not the working machine monitoring signal has been received. Since the working machine 101 is not being monitored and the working machine monitoring signal has been received at present, an affirmative determination "Yes" is provided (S4). The monitoring starter 113B starts the monitoring of the working machine 101 in the area 150A of the working machine 101 set by the area setter 110 (S5).

The first monitoring section 112 (monitoring starter 112B) of the monitoring computer 100 determines whether or not the battery 6 is not being monitored and whether or not it is immediately after the monitoring of the working machine 101. Since the battery 6 is not being monitored and it is immediately after the monitoring of the working machine 101 at present, an affirmative determination "Yes" is provided (S6). The monitoring starter 112B starts the monitoring of the battery 6 in the area 150B of the battery 6 set by the area setter 110 (S7).

The second monitoring section 113 (notifier 113A) of the monitoring computer 100 receives the vehicle body position from the communication module 45A of the working machine 101 (S8), and determines whether or not the vehicle body position is outside the area 150A. As shown in FIG. 7B, in a case where the working machine 101 is located outside the area 150A, an affirmative determination "Yes" is provided (S9). The notifier 113A notifies the computer 105 that "the tractor is out of the area" (S10). On the other hand, as shown in FIG. 7A, in a case where the working machine 101 is located in the area 150A, a negative determination "No" is provided in S9, and the above notification is not made.

The first monitoring section 112 (notifier 112A) of the monitoring computer 100 receives the position of the battery 6 from the communication module 45B of the battery 6 (S11), and determines whether or not the position of the battery 6 is outside the area 150B. As shown in FIG. 7B, in a case where the battery 6 is located outside the area 150B, an affirmative determination "Yes" is provided (S12). The notifier 112A notifies the computer 105 that "the battery is out of the area" (S13). On the other hand, as shown in FIG. 7A, in a case where the battery 6 is located in the area 150B, a negative determination "No" is provided in S12, and the above notification is not made.

Connectors indicated by "1" and "2" at a lower end of the flowchart shown in FIG. 10 are connected to connectors indicated by "1" and "2" at an upper end of the flowchart shown in FIG. 11. It is determined whether or not the remaining level of the battery 6 being mounted on the working machine 101 is equal to or lower than the predetermined value (S14). Until the remaining level of the battery 6 becomes equal to or lower than the predetermined value, a negative determination "No" is provided and the processing remains in S14, and in a case where the remaining level becomes equal to or lower than the predetermined value, an affirmative determination "Yes" is provided. When an affirmative determination "Yes" is provided in S14, the battery monitoring cancellation signal is transmitted from the communication module 45A of the working machine 101 to the monitoring computer 100 and received by the monitoring computer 100 (S15).

The first monitoring section 112 (monitoring terminator 112C) of the monitoring computer 100 determines whether or not the battery 6 is being monitored and whether or not the battery monitoring cancellation signal has been received. Since the battery 6 is being monitored and the battery monitoring cancel signal has been received at present, an affirmative determination "Yes" is provided (S16). The monitoring terminator 112C deletes the area 150B of the battery 6, and cancels the monitoring of the battery 6 (S17).

When an affirmative determination "Yes" is provided in S14, the request signal and the vehicle body position are transmitted from the communication module 45A of the working machine 101 to the computer 106 of the delivery base and received by the computer 106 (S18). Information indicating "there is a battery delivery request" and the vehicle body position are displayed on the display 106A of the computer 106 (S19). Based on this, the replacement battery 6 is delivered from the delivery base to the farm field F where the working machine 101 is located.

As shown in FIG. 8A, the replacement battery 6 is loaded on the transport vehicle T moving from the delivery base to the farm field F. If the area 150B of the battery 6 is set, the replacement battery 6 is located outside the area 150B. However, in S17 described above, the area 150B of the battery 6 is deleted, and the monitoring of the battery 6 is canceled. For this reason, the notification is not made corresponding to the replacement battery 6 and the battery 6 being mounted. Then, the transport vehicle T arrives at the area A of the farm field F that is in contact with the agricultural road R, and the replacement battery 6 is unloaded in the area A. In a case where an affirmative determination "Yes" is provided in S14, the working machine 101 working in the work area of the farm field F moves to the area A of the farm field F that is in contact with the agricultural road R by the automated driving (S20).

The working machine 101 determines whether or not the replacement of the battery 6 has been completed (S21). Until the battery 6 is replaced, a negative determination "No" is provided and the processing remains in S21, and when the replacement is completed, an affirmative determination "Yes" is provided. When an affirmative determination "Yes" is provided in S21, the battery monitoring signal is transmitted from the communication module 45A of the working machine 101 to the monitoring computer 100 and received by the monitoring computer 100 (S22).

The first monitoring section 112 (monitoring starter 112B) of the monitoring computer 100 determines whether or not the battery 6 is not being monitored and whether or not the battery monitoring signal has been received. Since the battery 6 is not monitored and the battery monitoring signal has been received at present, an affirmative determination "Yes" is provided (S23). The monitoring starter 112B starts the monitoring of the battery 6 again in the area 150B of the battery 6 set by the area setter 110 (S24).

Figure 8C:
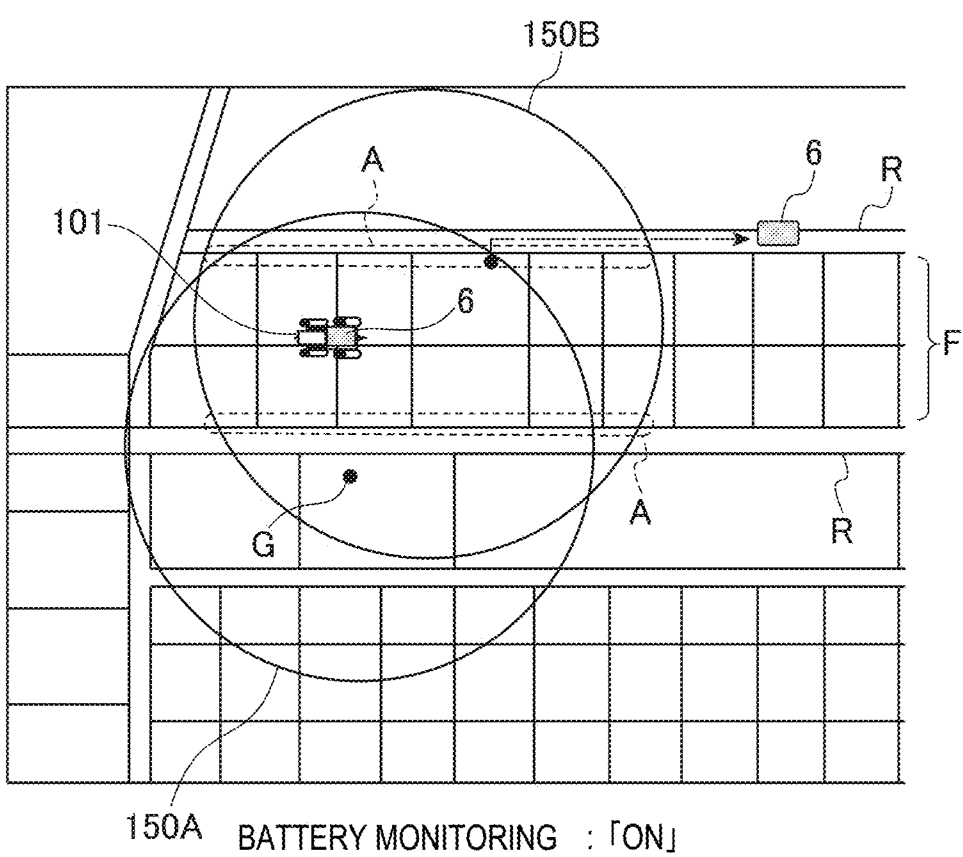

The first monitoring section 112 (notifier 112A) of the monitoring computer 100 receives the position of the battery 6 from the communication module 45B of the battery 6 (S25), and determines whether or not the position of the battery 6 is outside the area 150B. As shown in FIG. 8C, in a case where the battery 6 that is not mounted is carried away from the area A of the farm field F that is in contact with the agricultural road R and is located outside the area 150B, an affirmative determination "Yes" is provided (S26). The notifier 112A notifies the computer 105 that "the battery is out of the area" (S27). On the other hand, as shown in FIG. 8B, in a case where the battery 6 is located in the area 150B, a negative determination "No" is provided in S26, and the above notification is not made.

Connectors indicated by "1", "2", and "3" at a lower end of the flowchart shown in FIG. 11 are connected to connectors indicated by "1", "2", and "3" at an upper end of the flowchart shown in FIG. 12. When an affirmative determination "Yes" is provided in S21, the battery collection request signal and the vehicle body position are transmitted from the communication module 45A of the working machine 101 to the computer 106 of the delivery base and received by the computer 106 (S28). Information indicating "there is a battery collection request" and the vehicle body position are displayed on the display 106A of the computer 106 (S29). Based on this, the transport vehicle T moves to the farm field R where the working machine 101 is located in order to collect the used battery 6. The battery monitoring cancellation signal is transmitted from the computer 106 of the delivery base to the monitoring computer 100 and received by the monitoring computer 100 (S30).

The first monitoring section 112 (monitoring terminator 112C) of the monitoring computer 100 determines whether or not the battery 6 is being monitored and whether or not the battery monitoring cancellation signal has been received. Since the battery 6 is being monitored and the battery monitoring cancel signal has been received at present, an affirmative determination "Yes" is provided (S31). The monitoring terminator 112C deletes the area 150B of the battery 6, and cancels the monitoring of the battery 6 again (S32).

As shown in FIG. 9, the used battery 6 is loaded on the transport vehicle T that has arrived at the farm field F, and returns to the delivery base. If the area 150B of the battery 6 is set, the used battery 6 is located outside the area 150B. However, in S32 described above, the area 150B of the battery 6 is deleted, and the monitoring of the battery 6 is canceled. For this reason, the notification is not made corresponding to the used battery 6 and the battery 6 being mounted. Then, the transport vehicle T arrives at the delivery base, and the used battery 6 is unloaded and stored at the delivery base.

In a case where a negative determination "No" is provided in S4, the monitoring of the working machine 101 is not started. In a case where a negative determination "No" is provided in S6 and S23, the monitoring of the battery 6 is not started. In a case where a negative determination "No" is provided in S16 and S31, the monitoring of the battery 6 is not canceled.

Second Example Embodiment

In the first example embodiment, when the battery 6 is being monitored and it is determined that the battery 6 is located outside the area 150B, the notification for the battery 6 is provided. On the other hand, a second example embodiment is different from the first example embodiment only in that charging of a battery 6 is restricted when the battery 6 is being monitored and it is determined that the battery 6 that is not mounted is located outside an area 150B. Hereinafter, differences of the second example embodiment from the first example embodiment will be mainly described.

Figure 13:
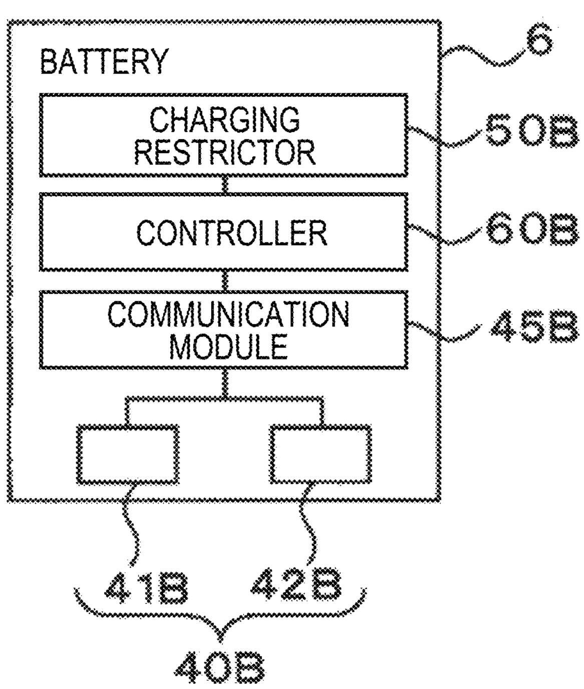
FIG. 13 is a functional block diagram of a battery in a monitoring system according to a second example embodiment of the present invention.

The battery 6 according to the second example embodiment is attachable to and detachable from a working machine 101 as in the first example embodiment. The battery 6 can be charged in a state of being separated from the working machine 101. As shown in FIG. 13, the battery 6 includes a controller 60B and a charging restrictor 50B in addition to a positioning device 40B and a communication module 45B.

The controller 60B is configured or programmed to include a computer (a CPU or the like), a storage (memory), and the like, and performs predetermined control based on a program stored in the storage. More specifically, the controller 60B is configured or programmed to control the charging restrictor 50B based on a signal or the like from a monitoring computer 100. The charging restrictor 50B is interposed in an electric path from a charging terminal of the battery 6 to a battery pack. The charge restrictor 50B has a switching function, and may be any device as long as the device can cut off and connect the electric path based on a control signal of the controller 60B. The charging restrictor 50B is usually connected to the electric path and allows charging of the battery 6. When the controller 60B determines that the communication module 45B has received a charging restriction signal described below, the controller 60B is configured or programmed to control the charging restrictor 50B to cut off the connected electric path. As a result, the charging of the battery 6 that is not mounted is restricted.

Figure 14:
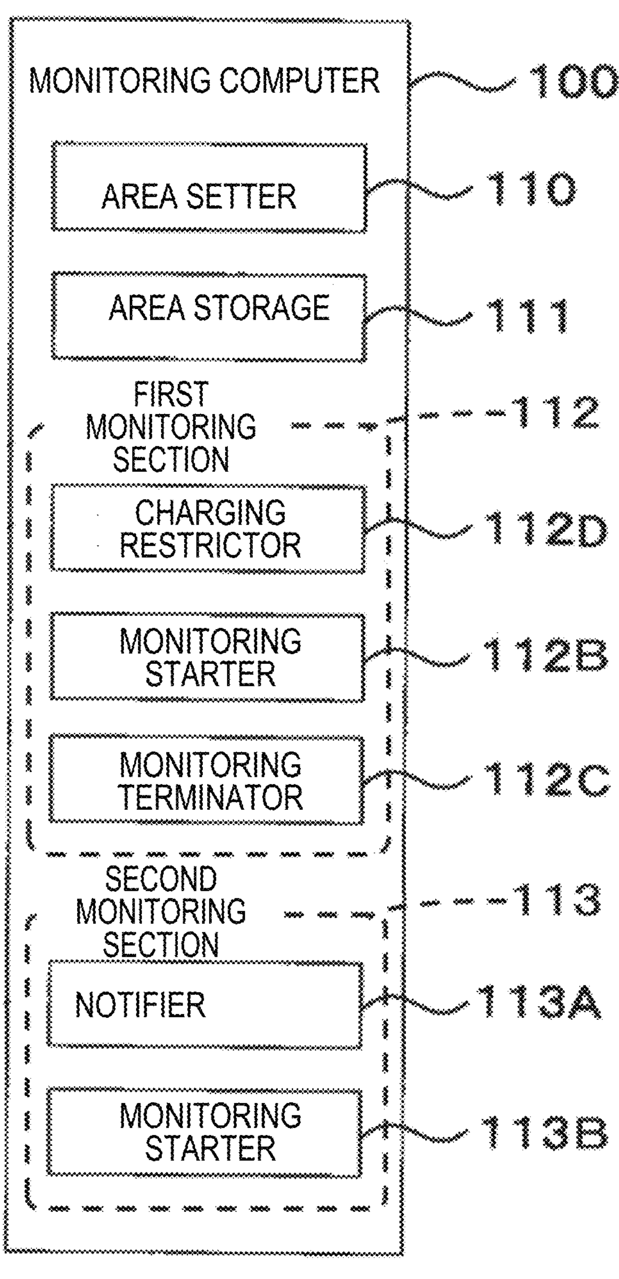
FIG. 14 is a functional block diagram of a monitoring computer in the monitoring system according to the second example embodiment of the present invention.

As shown in FIG. 14, in the monitoring computer 100 according to the second example embodiment, a first monitoring section 112 includes a charging restrictor 112D instead of the notifier 112A according to the first example embodiment. The charging restrictor 112D may include an electric/electronic circuit provided in the monitoring computer 100, a program stored in the monitoring computer 100, and the like. The charging restrictor 112D is configured or programmed to transmit the charging restriction signal to the battery 6 based on whether or not the battery 6 is located in the area 150B determined for the battery 6. When the monitoring computer 100 receives a position of the battery 6 transmitted by the communication module 45B of the battery 6 (the replacement battery 6 and the used battery)

that is not mounted, the charging restrictor 112D determines whether or not the position of the battery 6 is in the area 150B.

For example, as shown in FIG. 8B, in a case where the battery 6 is being monitored, the charging restrictor 112D does not transmit the charging restriction signal when the position of the battery 6 that is not mounted is in the area 150B. As a result, the charging of the battery 6 is allowed.

On the other hand, as shown in FIG. 8C, it is assumed that the battery 6 that is not mounted may deviate from the area 150B in the state shown in FIG. 8B. In this case, the charging restrictor 112D determines that the position of the battery 6 that is not mounted is outside the area 150B, and transmits the charging restriction signal to the battery 6. As a result, the electric path is cut off by the charging restrictor 50B, and the charging of the battery 6 is restricted. As described above, in the second example embodiment, the battery 6 is monitored so that the charging of the battery 6 that is not mounted is restricted.

In the present example embodiment, the battery 6 is used as a package capable of storing an energy source, and charging is limited. However, instead, for example, a hydrogen tank, an LPG tank, or the like may be used. In a case of using the tanks, replenishment of the tank or the like with the energy source (hydrogen, LPG, or the like) may be restricted in a case where it is determined that the tank is not located in the area. For example, a valve type actuator that closes a tank charging port based on a signal from the monitoring computer 100 may be used for the restriction of the replenishment with the energy source.

Third Example Embodiment

In the second example embodiment, when the battery 6 is being monitored and it is determined that the battery 6 that is not mounted is located outside the area 150B, the charging of the battery 6 is restricted. On the other hand, a third example embodiment is different from the first and second example embodiments only in that when a battery 6 is being monitored and it is determined that the battery 6 mounted on a working machine 101 is located outside an area 150B, electric power supply from the battery 6 to a prime mover 4 is restricted. Hereinafter, differences of the third example embodiment from the first and second example embodiments will be mainly described.

Figure 15:
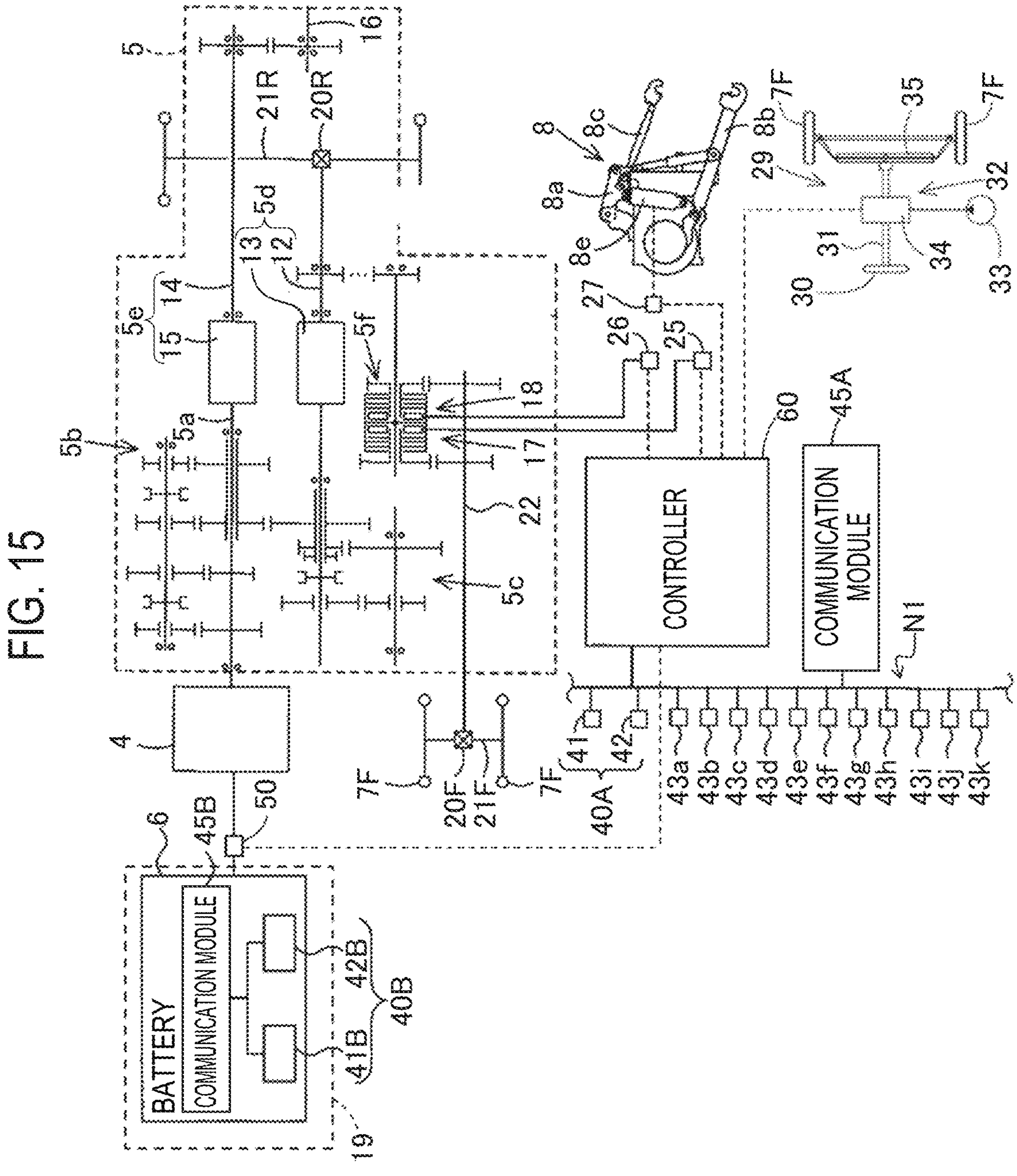
FIG. 15 is a functional block diagram of a working machine and a battery in a monitoring system according to a third example embodiment of the present invention.

The battery 6 according to the third example embodiment is attachable to and detachable from the working machine 101 as in the first example embodiment. As shown in FIG. 15, the battery 6 is capable of supplying electric power to the prime mover 4 (electric motor) or the like of the working machine 101 in a state of being mounted on the working machine 101. The working machine 101 includes an electric power supply restrictor 50 in addition to various devices.

A controller 60 of the working machine 101 is configured or programmed to control the electric power supply restrictor 50 based on a signal or the like from a monitoring computer 100. The electric power supply restrictor 50 is interposed in an electric path from an electric power supply terminal of the battery 6 to the prime mover 4. The electric power supply restrictor 50 may be, for example, an inverter to control a rotation speed of the prime mover 4, and may be any device as long as the device can cut off and connect the electric path based on a control signal of the controller 60. The electric power supply restrictor 50 is normally connected to the electric path and allows electric power supply from the battery 6 to the prime mover 4. When the controller 60 determines that a communication module 45A has received an electric power supply restriction signal described below, the controller 60 is configured or programmed to control the electric power supply restrictor 50 to cut off the connected electric path. As a result, the electric power supply from the battery 6 being mounted to the prime mover 4 is restricted, and driving of the prime mover 4 is also restricted.

Figure 16:
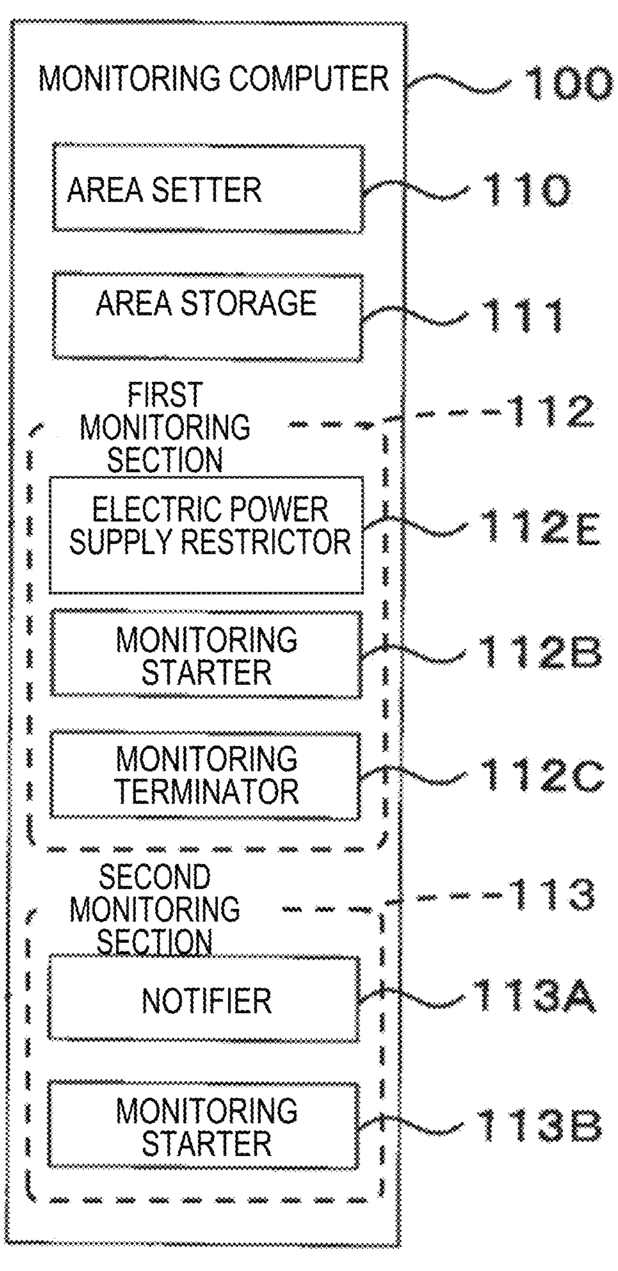
FIG. 16 is a functional block diagram of a monitoring computer in the monitoring system according to the third example embodiment of the present invention.

As shown in FIG. 16, in the monitoring computer 100 according to the third example embodiment, the first monitoring section 112 includes an electric power supply restrictor 112E instead of the charging restrictor 112D according to the second example embodiment. The electric power supply restrictor 112E may include an electric/electronic circuit provided in the monitoring computer 100, a program stored in the monitoring computer 100, and the like. The electric power supply restrictor 112E transmits the electric power supply restriction signal to the working machine 101 based on whether or not the battery 6 is located in an area 150B determined for the battery 6. When the monitoring computer 100 receives the position of the battery 6 transmitted by a communication module 45B of the mounted battery 6, the electric power supply restrictor 112E determines whether or not the position of the battery 6 is in the area 150B.

For example, as shown in FIG. 7A, in a case where the battery 6 is being monitored, the electric power supply restrictor 112E does not transmit the electric power supply restriction signal when the position of the mounted battery 6 is in the area 150B. As a result, the electric power supply from the battery 6 to the prime mover 4 is allowed, and the prime mover 4 can be driven.

On the other hand, as shown in FIG. 7B, it is assumed that the mounted battery 6 may deviate from the area 150B in the state shown in FIG. 7A. In this case, the electric power supply restrictor 112E determines that the position of the attached battery 6 is outside the area 150B, and transmits the electric power supply restriction signal to the working machine 101. As a result, the electric path is cut off by the electric power supply restrictor 50, the electric power supply from the battery 6 to the prime mover 4 is restricted, and the driving of the prime mover 4 is also restricted. As described above, in the third example embodiment, the battery 6 is monitored so that the electric power supply from the mounted battery 6 to the prime mover 4 is restricted.

In the present example embodiment, the battery 6 is used as a package capable of storing an energy source, and charging is limited. However, instead, for example, a hydrogen tank, an LPG tank, or the like may be used. In a case of using the tanks, the supply of the energy source (hydrogen, LPG, or the like) from the tank or the like to a fuel cell, an engine, or the like may be restricted in a case where it is determined that the tank is not located in the area. For example, a valve type actuator or the like that closes a path for supplying the energy source based on a signal from the monitoring computer 100 may be used for the restriction of the supply of the energy source.

Fourth Example Embodiment

In the third example embodiment, when the battery 6 is being monitored and it is determined that the mounted battery 6 is located outside the area 150B, the electric power supply from the battery 6 to the prime mover 4 is restricted. On the other hand, a fourth example embodiment is different from the first, second, and third example embodiments described above only in that attachment and detachment of a battery 6 to and from a working machine 101 is restricted when the battery 6 is being monitored and it is determined that the battery 6 mounted on the working machine 101 is located outside an area 150B. Hereinafter, differences of the fourth example embodiment from the first, second, and third example embodiments will be mainly described.

Figure 17:
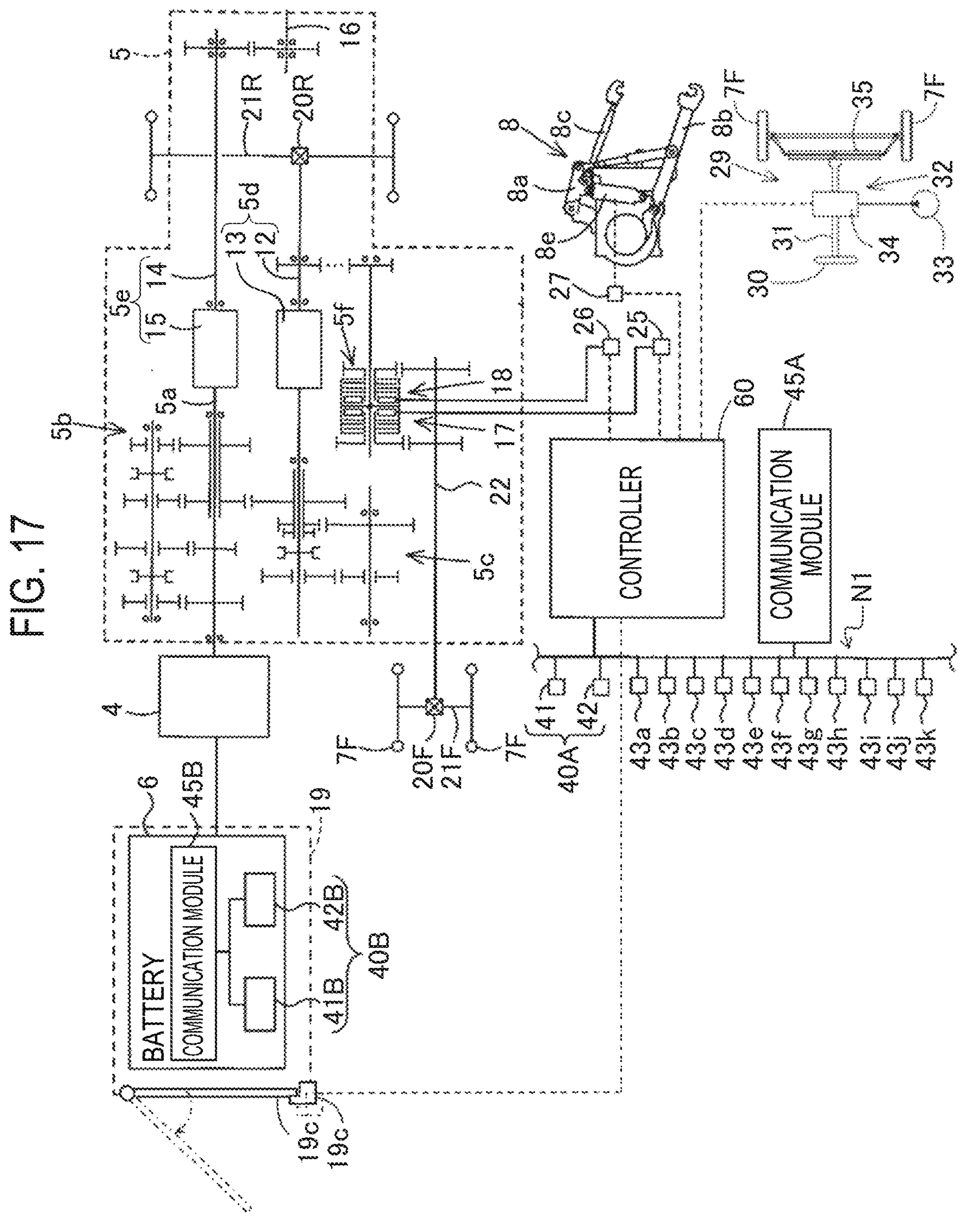
FIG. 17 is a functional block diagram of a working machine and a battery in a monitoring system according to a fourth example embodiment of the present invention.

The 6 according battery to the fourth example embodiment is attachable to and detachable from the working machine 101 as in the first example embodiment. As shown in FIGS. 17 and 18, the battery 6 can be housed in a battery mounting portion 19, and the battery mounting portion 19 includes a locking portion 19*d*. The locking portion 19*d* is provided at an edge of an opening 19*b*, and is configured to be able to lock an edge of a lid portion 19*c* in a state in which the lid portion 19*c* closes the opening 19*b*. The locking portion 19*d* is a locking actuator capable of switching between an unlocked state and a locked state according to a control signal of a controller 60.

Figure 18A:
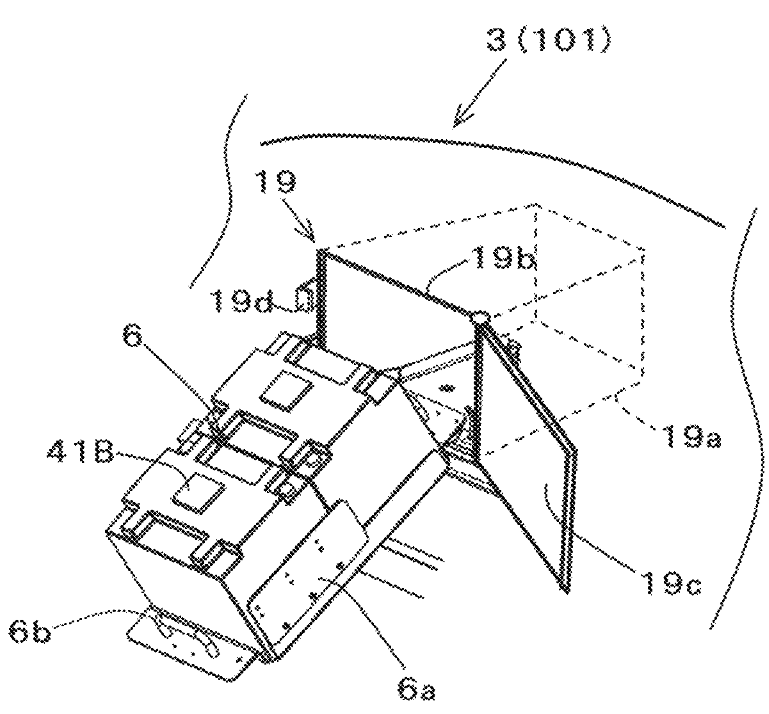
FIGS. 18A and 18B are views for explaining an unlocked state and a locked state in a battery mounting portion of the working machine.
Figure 18B:
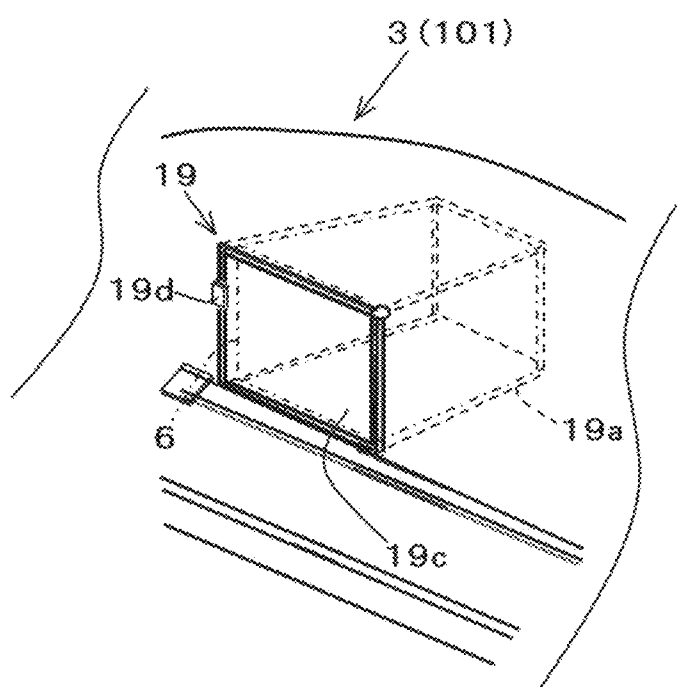

As shown in FIG. 18A, in the unlocked state, the locking of the lid portion 19*c* by the locking portion 19*d* can be released, and the opening 19*b* can be exposed through a flap-type operation of the lid portion 19*c* in a state in which the lid portion 19*c* closes the opening 19*b* (see FIG. 18B). As a result, the battery 6 can be separated from the housing portion 19*a*, and the battery 6 can be mounted on the housing portion 19*a*, so that replacement of the battery 6 can be achieved.

As shown in FIG. 18B, in the locked state, the locking of the lid portion 19*c* by the locking portion 19*d* is maintained, and the flap type operation of the lid portion 19*c* in the closed state is restricted in a state in which the lid portion 19*c* closes the opening 19*b*. Therefore, the opening 19*b* cannot be exposed. Accordingly, attachment and detachment of the battery 6 can be restricted. The locking portion 19*d* is normally in the unlocked state and allows attachment and detachment of the battery 6. When the controller 60 determines that a communication module 45A has received an attachment/detachment restriction signal described below, the controller 60 is configured or programmed to control the locking portion 19*d* to be in the locked state. As a result, the attachment and detachment of the battery 6 is restricted.

Figure 19:
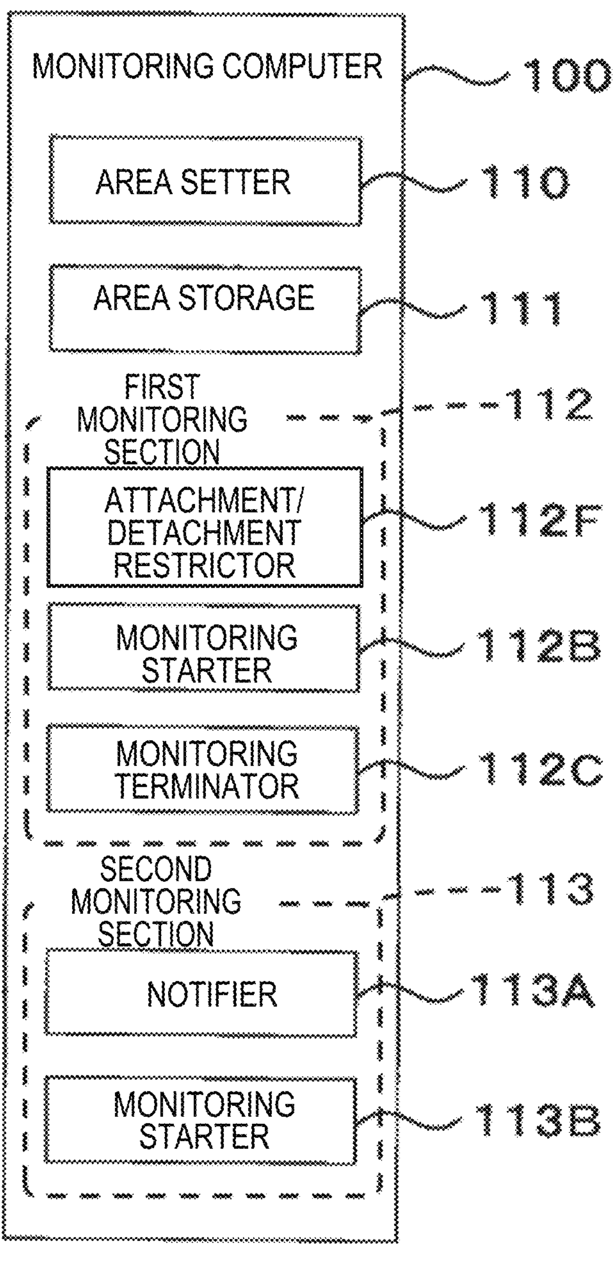
FIG. 19 is a functional block diagram of a monitoring computer in the monitoring system according to the fourth example embodiment of the present invention.

As shown in FIG. 19, in a monitoring computer 100 according to the fourth example embodiment, a first monitoring section 112 includes an attachment/detachment restrictor 112F instead of the electric power supply restrictor 112E according to the third example embodiment. The attachment/detachment restrictor 112F may include an electric/electronic circuit provided in the monitoring computer 100, a program stored in the monitoring computer 100, and the like. The attachment/detachment restrictor 112F transmits the attachment/detachment restriction signal to the working machine 101 based on whether or not the battery 6 is located in an area 150B determined for the battery 6. When the monitoring computer 100 receives a position of the battery 6 transmitted by a communication module 45B of the mounted battery 6, the attachment/detachment restrictor 112F determines whether or not the position of the battery 6 is in the area 150B.

For example, as shown in FIG. 7A, in a case where the battery 6 is being monitored, the attachment/detachment restrictor 112F does not transmit the attachment/detachment restriction signal when the position of the mounted battery 6 is in the area 150B. As a result, the attachment and detachment of the battery 6 to and from the working machine 101 are allowed, and the battery 6 can be replaced.

On the other hand, as shown in FIG. 7B, it is assumed that the mounted battery 6 may deviate from the area 150B in the state shown in FIG. 7A. In this case, the attachment/detachment restrictor 112F determines that the position of the attached battery 6 outside is the area 150B, and transmits the attachment/detachment restriction signal to the working machine 101. As a result, the locking portion 19*d* in the unlocked state is switched to the locked state, and the attachment and detachment of the battery 6 is restricted. As described above, in the fourth example embodiment, the battery 6 is monitored so that the attachment and detachment of the mounted battery 6 are restricted.

An example of monitoring of the battery 6 in each of the above-described example embodiments is one selected from notification for the battery 6 (first example embodiment), charging restriction for the battery 6 (second example embodiment), electric power supply restriction for the battery 6 (third example embodiment), and attachment/detachment restriction for the battery 6 (fourth example embodiment). Instead, for example, two or more examples selected from the notification, the charging restriction, the electric power supply restriction, and the attachment/detachment restriction for the battery 6 may be combined. In this case, the first monitoring section 112 of the monitoring computer 100 includes two or more selected from the notifier 112A, the charging restrictor 112D, the electric power supply restrictor 112E, and the attachment/detachment restrictor 112F.

Monitoring systems according to the example embodiments of the present invention may include the monitoring computer 100 including the battery 6 that stores the energy source to drive the working machine 101, the area setter 110 configured or programmed to set the area 150B for the battery 6, and the first monitoring section 112 configured or programmed to monitor the battery 6 by providing the notification for the battery 6 or the restriction for the battery 6 in a case where the battery 6 is not located in the set area 150B. With this configuration, in a case where the battery 6 is not located in the area 150B determined for the battery 6, the notification or restriction is provided. Therefore, the battery 6 can be easily monitored.

In the first example embodiment, in particular, the battery 6 is attachable to and detachable from the working machine 101, and the first monitoring section 112 is configured or programmed to provide the notification for the battery 6 in a case where the battery 6 that is not mounted on the working machine 101 is not located in the set area 150B. With this configuration, a monitoring target can be expanded using the notification also for the battery 6 that is not mounted on the working machine 101, such as the replacement battery 6 or the used battery 6. Even in a case where the battery 6 is left in the farm field, the battery 6 can be easily and reliably monitored.

In the second example embodiment, in particular, the battery 6 is attachable to and detachable from the working machine 101, and the first monitoring section 112 is configured or programmed to restrict the charging (energy source replenishment) of the battery 6 in a case where the battery 6 that is not mounted on the working machine 101 is not located in the set area 150B. Therefore, the monitoring target can be expanded using the charging restriction even for the battery 6 that is not mounted on the working machine 101, such as the replacement battery 6 or the used battery 6. Even in a case where the battery 6 is left in the farm field, the battery 6 can be easily and reliably monitored.

In the third example embodiment, in particular, the battery 6 is attachable to and detachable from the working machine 101, and the first monitoring section 112 is configured or programmed to restrict the electric power supply (energy source supply) from the battery 6 to the prime mover 4 of the working machine 101 in a case where the battery 6 mounted on the working machine 101 is not located in the set area 150B. With this configuration, the monitoring target can be expanded using the electric power supply restriction even for the battery 6 mounted on the working machine 101. Even in a state in which the battery 6 is mounted on the working machine 101, the battery 6 can be easily and reliably monitored. When the electric power supply of the battery 6 is restricted, the driving of the prime mover 4 is also restricted, so that the theft of the working machine 101 can also be prevented.

In the fourth example embodiment, in particular, the battery 6 is attachable to and detachable from the working machine 101, and the first monitoring section 112 is configured or programmed to restrict the attachment and detachment of the battery 6 to and from the working machine 101 in a case where the battery 6 mounted on the working machine 101 is not located in the set area 150B. With this configuration, the monitoring target can be expanded using the attachment/detachment restriction even for the battery 6 mounted on the working machine 101. Even in a state in which the battery 6 is mounted on the working machine 101, the battery 6 can be easily and reliably monitored. When the attachment and detachment of the battery 6 are restricted, replacement of the battery 6 is restricted when the remaining level of the battery 6 is exhausted, so that theft of the working machine 101 can also be prevented.

In each of the above-described example embodiments, in particular, the battery 6 is attachable to and detachable from the working machine 101, and can be delivered by the transport vehicle T or the like from the delivery base as the replacement battery 6 in a state in which the battery 6 is not mounted on the working machine 101, and the first monitoring section 112 cancels the monitoring in a case where the battery 6 to replace the battery 6 mounted on the working machine 101 is conveyed, and starts the monitoring in a case where the battery 6 for replacement is mounted on the working machine 101 while the monitoring is cancelled. With this configuration, for example, the monitoring can be canceled in a case where the replacement battery 6 is loaded on the transport vehicle T or the like in the delivery base located at a remote place from the farm field F, and the battery 6 is delivered toward the farm field F. In addition, in a case where the battery 6 is replaced in the farm field F and the used battery 6 is left in the farm field F, the canceled monitoring can be resumed. Therefore, erroneous detection at the time of delivery of the replacement battery 6 can be prevented, and the used battery 6 can be monitored.

In each of the above-described example embodiments, in particular, the first monitoring section 112 is configured or programmed to maintain the monitoring when the monitoring is started in a case where the battery 6 is mounted on the working machine 101, and the first monitoring section 112 is configured or programmed to cancel the monitoring in a case where the used battery 6 that is not mounted on the working machine 101 is collected while the monitoring is maintained. With this configuration, for example, in a case where the battery 6 is replaced in the farm field F and the used battery 6 is left in the farm field F, the monitoring of the used battery 6 can be maintained. In addition, in a case where the used battery 6 is loaded on the transport vehicle T or the like in the farm field F for collection of the battery 6, and the battery 6 is collected from the farm field F, the monitoring can be canceled. Therefore, it is possible to maintain the monitoring of the used battery 6 left in the farm field F, and it is possible to prevent erroneous detection at the time of the collection of the used battery 6.

In each of the above-described example embodiments, in particular, the battery 6 mounted on the working machine 101 is replaced such that the energy source to maintain the monitoring of the battery 6 remains. With this configuration, the battery 6 is replaced, and the energy source to maintain the monitoring (driving the positioning device 40B, the communication module 45B, and the like) can remain in the used battery 6 separated from the working machine 101. Therefore, the monitoring of the battery 6 can be maintained only by its own energy source in the used battery 6.

In each of the above-described example embodiments, in particular, the monitoring computer 100 includes the second monitoring section 113 configured or programmed to monitor whether or not the working machine 101 is located in the area 150A, the area setter 110 is configured or programmed to set the area 150B for the battery 6 based on the position of the working machine 101, and the first monitoring section 112 is configured or programmed to perform the monitoring of the battery 6 in a case where the monitoring of the working machine 101 by the second monitoring section 113 is performed. With this configuration, the monitoring of the working machine 101 can also be performed in addition to the monitoring of the battery 6. Since the area 150B is set based on the position of the working machine 101, for example, in a case where the battery 6 is replaced in the working machine 101 located in the farm field F, the area 150B can be set such that the area 150B includes a replacement position. In a case where the monitoring of the working machine 101 is performed, the battery 6 can be automatically monitored. Therefore, the battery 6 can be appropriately monitored while the working machine 101 is also monitored.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A monitoring system comprising:

a storage to store energy to drive a working machine, the storage being attachable to and detachable from the working machine; and a monitoring computer configured or programmed to include an area setter configured or programmed to set an area for the storage based on a position of the working machine, a second monitoring section configured or programmed to monitor whether or not the working machine is located in the area, and a first monitoring section configured or programmed to (i) monitor the storage, (ii) provide a notification for the storage or a restriction for the storage in a case where the storage is not located in the area, and (iii) cancel the monitoring in a case where a replacement storage to replace the storage mounted on the working machine is conveyed, and while the monitoring is cancelled, start the monitoring in a case where the replacement storage is mounted on the working machine to become the storage.

2. The monitoring system according to claim 1, wherein the first monitoring section is configured or programmed to provide the notification for the storage in a case where the replacement storage that is not mounted on the working machine is not located in the set area.

3. The monitoring system according to claim 1, wherein the first monitoring section is configured or programmed to restrict replenishment of the storage with an energy source in a case where the replacement storage that is not mounted on the working machine is not located in the area.

4. The monitoring system according to claim 1, wherein the first monitoring section is configured or programmed to restrict supply of an energy source to the working machine in a case where the storage mounted on the working machine is not located in the area.

5. The monitoring system according to claim 1, wherein the first monitoring section is configured or programmed to restrict attachment and detachment of the replacement storage to and from the working machine in a case where the storage mounted on the working machine is not located in the area.

6. The monitoring system according to claim 1, wherein the replacement storage is conveyable in a state of not being mounted on the working machine; and the first monitoring section is configured or programmed to cancel the monitoring in a case where the replacement storage to replace the storage mounted on the working machine is conveyed, and start the monitoring in a case where the replacement storage is mounted on the working machine while the monitoring is cancelled.

7. The monitoring system according to claim 1, wherein the first monitoring section is configured or programmed to maintain the monitoring in a case where the monitoring is started, and the first monitoring section is configured or programmed to cancel the monitoring in a case where the replacement storage that is not mounted on the working machine is conveyed while the monitoring is maintained.

8. The monitoring system according to claim 1, wherein the storage mounted on the working machine is replaced such that an energy source to maintain the monitoring remains.

9. The monitoring system according to claim 1, wherein the first monitoring section is configured or programmed to perform the monitoring of the storage in only a case where the second monitoring section is performing the monitoring of the working machine.

10. The monitoring system according to claim 1, wherein the first monitoring section is configured or programmed to perform the monitoring of the storage in a case where the second monitoring section performs the monitoring of the working machine.

11. The monitoring system according to claim 7, wherein the first monitoring section is configured or programmed to perform the monitoring of the storage in a case where the second monitoring section performs the monitoring of the working machine.

12. The monitoring system according to claim 1, wherein the storage includes a communication module and an energy source separate from the energy to drive the working machine, and the storage in a depleted state is configured to continue transmitting a position signal to the monitoring computer after detachment from the working machine using the energy source while the first monitoring section is performing the monitoring of the storage.

13. The monitoring system according to claim 1, wherein the restriction for the storage includes at least one of:

prohibiting attachment of the replacement storage to the working machine when the storage is out of the area, prohibiting detachment of the storage from the working machine when the storage is out of the area and mounted, prohibiting charging of the storage when the storage is out of the area and not mounted, prohibit the storage from driving a prime mover, and the restriction is enforced only while the first monitoring section is performing the monitoring of the storage.

14. The monitoring system according to claim 1, wherein the monitoring computer is further configured or programmed to:

receive a signal indicating that the replacement storage is being conveyed by a delivery vehicle or collected for transport, cancel the monitoring of the storage while in a depleted state in response to the signal while maintaining the monitoring of the working machine by the second monitoring section, and resume the monitoring of the storage upon receiving a signal that the replacement storage is mounted on the working machine and is now the storage.

15. A monitoring system comprising:

a storage to store energy to drive a working machine; and a monitoring computer configured or programmed to include an area setter configured or programmed to set an area for the storage, and a first monitoring section configured or programmed to monitor the storage by providing a notification for the storage or a restriction for the storage in a case where the storage is not located in the set area, wherein the storage is attachable to and detachable from the working machine and is conveyable in a state of not being mounted on the working machine, and the first monitoring section is configured or programmed to cancel the monitoring in a case where the storage to replace the storage mounted on the working machine is conveyed, and the first monitoring section is configured or programmed to start the monitoring in a case where the storage for the replacement is mounted on the working machine while the monitoring is cancelled.

16. The monitoring system according to claim 15, wherein the first monitoring section is configured or programmed to maintain the monitoring in a case where the monitoring is started, and the first monitoring section is configured or programmed to cancel the monitoring in a case where the replacement storage that is not mounted on the working machine is conveyed while the monitoring is maintained.

17. The monitoring system according to claim 16, wherein the storage mounted on the working machine is replaced such that an energy source to maintain the monitoring remains.

18. The monitoring system according to claim 15, wherein the monitoring computer is configured or programmed to include a second monitoring section configured or programmed to monitor whether or not the working machine is located in the area;

the area setter is configured or programmed to set the area for the storage based on a position of the working machine; and the first monitoring section is configured or programmed to perform the monitoring of the storage in a case where the second monitoring section performs the monitoring of the working machine.

19. The monitoring system according to claim 15, wherein the monitoring computer is configured or programmed to include a second monitoring section configured or programmed to monitor whether or not the working machine is located in the area;

the area setter is configured or programmed to set the area for the storage based on a position of the working machine; and the first monitoring section is configured or programmed to perform the monitoring of the storage in a case where the second monitoring section performs the monitoring of the working machine.

20. The monitoring system according to claim 16, wherein the monitoring computer is configured or programmed to include a second monitoring section configured or programmed to monitor whether or not the working machine is located in the area;

the area setter is configured or programmed to set the area for the storage based on a position of the working machine; and the first monitoring section is configured or programmed to perform the monitoring of the storage in a case where the second monitoring section performs the monitoring of the working machine.

* * * * *